United States Patent [19]

Kucera et al.

[11] Patent Number: 4,868,750

[45] Date of Patent: Sep. 19, 1989

[54] COLLOCATIONAL GRAMMAR SYSTEM

[75] Inventors: Henry Kucera, Providence, R.I.; Alwin B. Carus, Newton, Mass.; Jeffrey G. Hopkins, Pawtucket, R.I.

[73] Assignee: Houghton Mifflin Company, Boston, Mass.

[21] Appl. No.: 106,127

[22] Filed: Oct. 7, 1987

[51] Int. Cl.[4] .............................................. G06F 15/02
[52] U.S. Cl. ..................................... 364/419; 364/900
[58] Field of Search ................ 364/419, 900 MS File, 364/200 MS File

[56] References Cited

U.S. PATENT DOCUMENTS

| | | | |
|---|---|---|---|
| 4,661,924 | 4/1987 | Okamoto et al. | 364/900 |
| 4,703,425 | 10/1987 | Muraki | 364/419 |
| 4,724,523 | 2/1988 | Kucera | 364/419 |
| 4,742,481 | 5/1988 | Yoshimura | 364/419 |
| 4,747,053 | 5/1988 | Yoshimura | 364/419 |
| 4,750,122 | 6/1988 | Kaji | 364/419 |
| 4,760,528 | 7/1988 | Levin | 364/419 |
| 4,773,009 | 9/1988 | Kucera | 364/419 |

OTHER PUBLICATIONS

*Choice of Grammatical Word-Class Without Global Syntactic Analysis: Tagging Words in the Lob Corpus*, Marshall, Ian in *Computers and the Humanities* 17 (1983) 139-150.

*Primary Examiner*—Michael R. Fleming
*Attorney, Agent, or Firm*—Lahive & Cockfield

[57] ABSTRACT

A system for the grammatical annotation of natural language receives natural language text and annotates each word with a set of tags indicative of its possible grammatical or syntactic uses. An empirical probability of collocation function defined on pairs of tags is iteratively extended to a selected set of tag sequences of increasing length so as to select a most probable tag for each word of a sequence of ambiguously-tagged words. For listed pairs of commonly confused words a substitute calculation reveals erroneous use of the wrong word. For words with tags having abnormally low frequency of occurrence, a stored table of reduced probability factors corrects the calculation. Once the text words have been annotated with their most probable tags, the tagged text is parsed by a parser which successively applies phrasal, predicate and clausal analysis to build higher structures from the disambiguated tag strings. A voice/text translator including such a tag annotator resolves sound or spelling ambiguity of words by their differing tags. A database retrieval system, such as a spelling checker, includes a tag annotator to identify desired data by syntactic features.

17 Claims, 13 Drawing Sheets

|  |  |  |
|---|---|---|
| . | SENTENCE CLOSER (PUNCTUATION TAG) | 01 |
| ( | OPEN PARENTHESIS (PUNCTUATION TAG) | 02 |
| * | "NOT" (ADVERBIAL TAG) | 03 |
| ) | CLOSE PARENTHESIS (PUNCTUATION TAG) | 04 |
| ; | SEMI-COLON (PUNCTUATION TAG) | 05 |
| — | DASH (PUNCTUATION TAG) | 06 |
| , | COMMA (PUNCTUATION TAG) | 07 |
| : | COLON (PUNCTUATION TAG) | 08 |
| ABL | PRE-QUALIFIER (PRE-NOMINAL TAG) | 09 |
| ABN | PRE-QUANTIFIER (PRE-NOMINAL TAG) | 10 |
| ABX | PRE-QUANTIFIER/DOUBLE CONJUNCTION (PRE-NOMINAL TAG) | 11 |
| AP | POST-DETERMINER (PRE-NOMINAL TAG) | 12 |
| AT | ARTICLE (PRE-NOMINAL TAG) | 13 |
| BED | "WERE" (VERBAL TAG) \<F\> | 14 |
| BEDZ | "WAS" (VERBAL TAG) \<F\> | 15 |
| BEG | "BEING" (VERBAL TAG) \<N\> | 16 |
| BEI | "BE"-BASE FORM (VERBAL TAG) \<N\> | 17 |
| BEM | "AM" (VERBAL TAG) \<F\> | 18 |
| BEN | "BEEN" (VERBAL TAG) \<N\> | 19 |
| BER | "ARE" (VERBAL TAG) \<F\> | 20 |
| BEZ | "IS" (VERBAL TAG) \<F\> | 21 |
| CC | COORDINATING CONJUNCTION (SENTENTIAL TAG) | 22 |
| CD | CARDINAL NUMBER (PRE-NOMINAL TAG) | 23 |
| CS | SUBORDINATING CONJUNCTION (SENTENTIAL TAG) | 24 |
| DOD | "DID" (VERBAL TAG) \<F\> | 25 |
| DOG | "DOING" (VERBAL TAG) \<N\> | 26 |
| DOI | "DO"-BASE FORM (VERBAL TAG) \<N\> | 27 |
| DON | "DONE" (VERBAL TAG) \<N\> | 28 |
| DOP | "DO" (VERBAL TAG) \<N\> | 29 |
| DOZ | "DOES" (VERBAL TAG) \<F\> | 30 |
| DT | SINGULAR DETERMINER (PRE-NOMINAL TAG) | 31 |
| DTI | SINGULAR/PLURAL DETERMINER (PRE-NOMINAL TAG) | 32 |
| DTS | PLURAL DETERMINER (PRE-NOMINAL TAG) | 33 |
| DTX | DETERMINER/DOUBLE CONJUNCTION (PRE-NOMINAL TAG) | 34 |
| EX | EXISTENTIAL "THERE" (NOMINAL TAG) \<P\> | 35 |
| HVD | "HAD"; PAST TENSE (VERBAL TAG) \<F\> | 36 |
| HVG | "HAVING" (VERBAL TAG) \<N\> | 37 |
| HVI | "HAVE"-BASE FORM (VERBAL TAG) \<N\> | 38 |
| HVN | "HAD"; PAST PARTICIPLE (VERBAL TAG) \<N\> | 39 |
| HVP | "HAVE" (VERBAL TAG) \<N\> | 40 |
| HVZ | "HAS" (VERBAL TAG) \<F\> | 41 |
| IN | PREPOSITION (SENTENTIAL TAG) | 42 |
| JJ | ADJECTIVE (PRE-NOMINAL TAG) | 43 |
| JJR | COMPARATIVE ADJECTIVE (PRE-NOMINAL TAG) | 44 |
| JJS | SUPERLATIVE ADJECTIVE (PRE-NOMINAL TAG) | 45 |
| JJT | SEMANTIC SUPERLATIVE (PRE-NOMINAL TAG) | 46 |
| MD | MODAL AUXILARY (VERBAL TAG) \<F\> | 47 |

*FIG. 2*
(01 THRU 47)

| | | |
|---|---|---|
| NN | SINGULAR COMMON NOUN - BASE FORM (NOMINAL TAG) <N> | 48 |
| NN$ | POSSESSIVE SINGULAR COMMON NOUN (PRE-NOMINAL TAG) | 49 |
| NNS | PLURAL COMMON NOUN (NOMINAL TAG) <N> | 50 |
| NNS$ | POSSESSIVE PLURAL COMMON NOUN (PRE-NOMINAL TAG) | 51 |
| NNX | NON-POSSESSIVE COMMON NOUN - BASE FORM (NOMINAL TAG) <N> | 52 |
| NP | SINGULAR PROPER NOUN - BASE FORM (NOMINAL TAG) <N> | 53 |
| NP$ | POSSESSIVE SINGULAR PROPER NOUN (PRE-NOMINAL TAG) | 54 |
| NPS | PLURAL PROPER NOUN (NOMINAL TAG) <N> | 55 |
| NPS$ | POSSESSIVE PLURAL PROPER NOUN (PRE-NOMINAL TAG) | 56 |
| NR | SINGULAR ADVERBIAL NOUN - BASE FORM (NOMINAL TAG) <P> | 57 |
| NR$ | POSSESSIVE SINGULAR ADVERBIAL NOUN (PRE-NOMINAL TAG) | 58 |
| NRS | PLURAL ADVERBIAL NOUN (NOMINAL TAG) <P> | 59 |
| NRS$ | POSSESSIVE PLURAL ADVERBIAL NOUN (PRE-NOMINAL TAG) | 60 |
| OD | ORDINAL NUMBER (PRE-NOMINAL TAG) | 61 |
| PN | NOMINAL PRONOUN (NOMINAL TAG) <P> | 62 |
| PN$ | POSSESSIVE NOMINAL PRONOUN (PRE-NOMINAL TAG) | 63 |
| PP$ | POSSESSIVE PRONOUN (PRE-NOMINAL TAG) | 64 |
| PP$$ | SECOND POSSESSIVE PRONOUN (NOMINAL TAG) <P> | 65 |
| PPL | SINGULAR REFLEXIVE PRONOUN (NOMINAL TAG) <P> | 66 |
| PPLS | PLURAL REFLEXIVE PRONOUN (NOMINAL TAG) <P> | 67 |
| PPO | OBJECTIVE PERSONAL PRONOUN (NOMINAL TAG) <P> | 68 |
| PPS | THIRD PERSON NOMINATIVE PERSONAL PRONOUN (NOMINAL TAG <P> | 69 |
| PPSS | NON-THIRD PERSON NOMINATIVE PERSONAL PRONOUN (NOMINAL TAG) <P> | 70 |
| PPX | NON-POSSESSIVE PERSONAL PRONOUN (NOMINAL TAG) <P> | 71 |
| QL | QUALIFIER (PRE-NOMINAL TAG) | 72 |
| QLP | POST-QUALIFIER (PRE-NOMINAL TAG) | 73 |
| RB | ADVERB (ADVERBIAL TAG) | 74 |
| RBR | COMPARATIVE ADVERB (ADVERBIAL TAG) | 75 |
| RBT | SUPERLATIVE ADVERB (ADVERBIAL TAG) | 76 |
| RN | NOMINAL ADVERB (ADVERBIAL TAG) | 77 |
| RP | ADVERB/PARTICLE (ADVERBIAL TAG) | 78 |
| TO | INFINITIVAL "TO" (VERBAL TAG) <(IN)> | 79 |
| UH | EXCLAMATION (SENTENTIAL TAG) | 80 |
| VBD | VERB PAST TENSE FORM (VERBAL TAG) <F> | 81 |
| VBG | VERB PRESENT PARTICIPLE (VERBAL TAG) <N> | 82 |
| VBI | VERB INFINITIVE - BASE FORM (VERBAL TAG) <N> | 83 |
| VBN | VERB PAST PARTICIPLE (VERBAL TAG) <N> | 84 |
| VBP | VERB NON-THIRD PERSON SINGULAR, PRESENT TENSE (VERBAL TAG) <N> | 85 |
| VBZ | VERB THIRD-PERSON SINGULAR, PRESENT TENSE (VERBAL TAG) <F> | 86 |
| WDT | WH-DETERMINER (PRE-NOMINAL TAG) | 87 |
| WP$ | PERSONAL WH-PRONOUN (PRE-NOMINAL TAG) | 88 |
| WPO | OBJECTIVE WH-PRONOUN (NOMINAL TAG) <P> | 89 |
| WPS | NOMINATIVE WH-PRONOUN (NOMINAL TAG) <P> | 90 |
| WQL | WH-QUALIFIER (PRE-NOMINAL TAG) | 91 |
| WRB | WH-ADVERB (ADVERBIAL TAG) | 92 |
| XX | - PARSER INTERNAL · NO TAG ASSIGNED - | 93 |
| ZZZZ | END-OF-FILE MARKER | 94 |

*FIG. 2*

(48 THRU 94)

EXAMPLES OF "NORMAL" MAIN DICTIONARY RECORDS

| |1 | |26 | |30 | |34 | |80 |
|---|---|---|---|---|
| . | | | . | |
| ! | | | . | |
| a | | | AT | |
| aback | | | RB | |
| abandonment | N1 | | | |
| abase | | V1 | | |
| abasement | N1 | | | |
| abashed | | | JJ | |
| as | | | CS IN QL RB | |
| back | N1 | V1 | JJ RB | |
| backing | N1 | | | |

FIG. 3A

EXAMPLES OF "EXCEPTION" MAIN DICTIONARY RECORDS

| |1 | |26 | |30 | |34 | |80 |
|---|---|---|---|---|
| adieu | N1s | | (NN: adieus/adieux) | $ |
| adieus | N4p | | (NNS: adieu) | $ |
| adieux | N4p | | (NNS: adieu) | $ |
| am | | | BEM (xref: be) | $ |
| are | | | BER (xref: be) | $ |
| arise | | | (VBI-1: arose/arisen) | $ |
| arisen | | | (VBN: arise) | $ |
| arose | | | (VBD: arise) | $ |
| ate | | | (VBD: eat) | $ |
| awake | | | JJ RB (VBI-1: awoke/awoken) | $ |
| awoke | | | (VBD: awake) | $ |
| awoken | | | (VBN: awake) | $ |
| bacilli | | | (NNS: bacillus) | $ |
| bacillus | | | (NN: bacilli) | $ |
| bade | | | (VBX: bid) | $ |
| base | | | (NN: bases) | $ |
| bases | | | (NNS: base/basis) | $ |
| basis | | | (NN: bases) | $ |
| be | | | BEI (xref: is) | $ |
| bear | | | (VBI-1: bore/borne) | $ |

FIG. 3B

EXAMPLES OF "CONTRACTION" MAIN DICTIONARY RECORDS

| \1 | \26 | \36 | \46 | \56 | \66 | \80 |
|---|---|---|---|---|---|---|
| 'tis | PPS+BEZ | | | | | + |
| ain't | BEM+* | BER+* | BEZ+* | HVP+* | HVZ+* | + |
| aren't | BER+* | | | | | + |
| can't | MD+* | | | | | + |
| cannot | MD+* | | | | | + |
| could've | MD+HVI | | | | | + |
| couldn't | MD+* | | | | | + |
| didn't | DOD+* | | | | | + |
| doesn't | DOZ+* | | | | | + |
| don't | DOP+* | | | | | + |

FIG. 3C

GRAMMATICAL ANNOTATION OF TEST SENTENCE

| Loc.: | Word: | Tag String: |
|---|---|---|
| 1: | John | NP |
| 2: | wants | NNS (BF=want) VBZ (=BF) |
| 3: | to | IN TO |
| 4: | sell | VBI VBP |
| 5: | the | AT |
| 6: | new | JJ |
| 7: | metropolitan | JJ |
| 8: | zoo | NN |
| 9: | all | ABN QL RB |
| 10: | his | PP$ PP$$ |
| 11: | cleverly | RB |
| 12: | trained | VBN (BF=train) VBD (=BF) |
| 13: | and | CC |
| 14: | brilliantly | QL RB |
| 15: | plumaged | JJ |
| 16: | parakeets | NNS (BF=parakeet) |
| 17: | . | . |

FIG. 5

LIST OF MAJOR CLASS HEADERS FOR TAGS

| Class | Description | Tags |
|---|---|---|
| AB | pre-qualifiers and pre-quantifiers | 3 |
| AP | post determiner | 1 |
| AT | article | 1 |
| BE | forms of the verb "to be" | 8 |
| CC | coordinating conjunction | 1 |
| CD | cardinal number | 1 |
| CS | subordinating conjunction | 1 |
| DO | forms of the verb "to do" | 6 |
| DT | determiners | 4 |
| EX | existential "there" | 1 |
| HV | forms of the verb "to have" | 6 |
| IN | preposition | 1 |
| JJ | adjectives | 4 |
| MD | modal auxiliary | 1 |
| NN | common nouns | 5 |
| NP | proper nouns | 4 |
| NR | adverbial nouns | 4 |
| OD | ordinal number | 1 |
| PN | nominal pronouns | 2 |
| PP | personal pronouns | 8 |
| QL | qualifiers | 2 |
| RB | adverbs | 3 |
| RN | nominal adverb | 1 |
| RP | adverb/particle | 1 |
| TO | infinitival "to" | 1 |
| UH | exclamation | 1 |
| VB | verbs | 6 |
| WD | wh-determiner | 1 |
| WP | personal wh-pronouns | 3 |
| WQ | wh-qualifier | 1 |
| WR | wh-adverb | 1 |
| XX | none of the above (GCS-internal only) | 1 |

*FIG. 4*

COLLOCATIONAL GRAMMAR SYSTEM

The present invention relates to automated language analysis systems, and relates to such systems embodied in a computer for receiving digitally encoded text composed in a natural language, and using a stored dictionary of words and an analysis program to analyze the encoded text and to identify errors. In particular, it relates to systems for the grammatical analysis of encoded text.

In recent years a number of systems have been developed for the automated recognition of syntactic information. A survey of some systems appears in the textbook of Winograd, *Language as a Cognitive Process—Syntax* (ISBN 0-201-08571-2 v. 1) at pages 357–361 and pages 390–403. As a rule, although a number of theoretical linguistic formalisms have been developed to identify correct grammatical constructions, the practical construction of grammatical analyzing devices has proven difficult. Because the number of combinations of possible parts of speech for a string of words escalates exponentially with string length, syntax-recognizing systems have in general been limited to operating on text having a small, well-defined vocabulary, or to operating on more general text but dealing with a limited range of syntactic features. Extensions of either vocabulary or syntactic range require increasingly complex structures and an increasing number of special recognition rules, which would make a system large or too unwieldy for commercial implementation on commonly available computing systems. Moreover, the automated grammatical systems which have been designed are special processors, in that they are not adapted to conventional word processing or computer-aided publishing functions. For example, such systems may require that their input text be at least sufficiently pre-edited so that it is both correctly spelled and grammatically well-formed. A misspelling, a wrong word such as a homonym, a compound word, or even a simple syntax error may render an input sentence unanalyzable.

OBJECTS OF THE INVENTION

It is an object of the present invention to provide an improved device for the grammatical analysis of digitally encoded natural language text.

It is another object of the invention to provide a digital text analyzer for assigning tags to each word of a digitally encoded text indicative of syntactic or inflectional features of the word.

It is a further object of the invention to provide a grammatical analyzer for encoded text which identifies the most probable tags of words of a sentence based upon collocation probabilities of their occurrence with adjacent tags.

It is a further object of the invention to provide a grammatical analyser which accepts as an input unedited text material having misspellings and vocabulary errors.

These and other features of the invention are obtained in an apparatus for the grammatical annotation of digitally encoded text material, preferably including a stored dictionary wherein each entry represents a word together with tags indicative of possible syntactic and inflectional features of the word. A sentence of digitally encoded text is passed to the grammatical annotator, which first operates on the words of the sentence to annotate each word with a sequence of possible tags for the word, and next operates on strings of tags of adjacent words to determine the probable tags, in order of likelihood, for each word.

This produces a "disambiguated" tag set which identifies a most probable tag assignment, for each word of a string of words, and one or more next most likely tag assignments. The disambiguated tag set serves as an input to a grammar processor which in a preferred embodiment uses the tags to identify basic grammatical units such as noun phrases and simple predicates, and processes these units to determine the parse of the sentence.

Preferably, the stored dictionary of words includes data codes representative of features such as gender and number, requiring agreement among words, and this information is used to select proper constructions during processing. The system preferably also includes a morphological analyzer, which uses prefixes, suffixes and other structural attributes of words to recognize certain classes of words which are not in the stored dictionary. For such a word, the analyser then creates a dictionary entry with appropriate tags so that grammatical processing proceeds as though the word were in the database.

More specifically, the grammatical analyzer annotates the words of a sentence of text with grammatical tags and inflectional features of the word using one or more of the above techniques. Each string of multiply-tagged words between two unambiguously-tagged words is then analyzed by a disambiguation sub-system which applies a collocational probability matrix to adjacent pairs of tags to iteratively construct a probability-like measure and to determine a most probable tag string corresponding to the string of words. Candidate tag strings of lesser probability are stacked for use if a later processing step eliminates the "most probable" tag string. This results in a "disambiguated" sentence structure in which one or more likely tags are identified for each word of the sentence.

In a preferred implementation, the probability-like measure is iteratively defined on generations of successively longer tag strings corresponding to sequences of words. Nodes which generate strings of lesser probability are pruned from the calculation as it proceeds, so that only a handful of potentially thousands of tag strings need be processed.

In a further embodiment of the invention, the values assigned by the collocation matrix are further modified, for tags of particular words appearing in a reduced tag probability database, in accordance with a table of reduced probabilities. In a further preferred embodiment, when a word of the string appears in another database, called the "commonly confused word" database, an augmented set of tag strings is created by substituting tags corresponding to a correlated word, and the substituted tag strings are collocationally evaluated as candidates for the most probable tag string. In a further embodiment, the tag strings selected in one of the foregoing operations are also checked against templates representative of erroneous or rare parses to detect common errors. When a sentence has been annotated with tags and a most probable parse identified, the annotated sentence is then parsed by a parsing component which determines a parse of the whole sentence.

The parsing component of a prototype system operates on the "most probable parse" (henceforth "MPP") tags assigned by the disambiguation sub-system to the words of a given sentence, in order to assign the higher syntactic structure of the sentence and also to detect and suggest corrections for certain types of errors in the sentence. The parsing process preferably proceeds in three general phases: (a) the identification of the simplex noun phrases (NPs) in the sentence and, if there is more than one simplex NP, their combination into complex NPs; (b) the identification of the simplex verb groups (VGs) in the sentence and, if there is more than one simplex VG, their combination into complex VGs; and (c) the assigning of structure to complete sentences.

In addition to its applications in a grammatical text analyzer, a disambiguator according to the invention includes improvements to existing types of non-grammar language processors. For example, an improved spelling checker according to the invention includes a spelling checker of the type wherein each erroneously-spelled word is identified and a list of possibly-intended words is displayed. Conventionally, such systems display a list of words which are selected as having approximately the same spelling as the erroneously-spelled word. An improved system according to the present invention includes a partial or complete grammatical processor which determines the local context of a word (i.e., its likley tags or a definite tag), and which selects from among the candidate replacement words so as to display only the possibly intended words having a tag compatible with the syntactic context of the misspelled word.

In an improved speech recognition (or speech synthesis) system embodying the invention, a disambiguation module or a grammatical processor differentiates pairs of homonyms (respectively, homographs) by probable syntactic context, thereby eliminating a common source of errors in the conversion of text-to-sound (respectively, sound-to-text). Other examples are described, following a detailed description of a prototype embodiment of a grammatical disambiguation system.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings.

BRIEF DESCRIPTION OF THE DRAWINGS

FIG. 2 is a listing of system tags in an illustrative embodiment;

FIGS. 3A, 3B, 3C are samples of dictionary records;

FIG. 4 is a listing of major classes of tags with corresponding structural processing group codes;

FIG. 5 is a representative text sentence annotated with its dictionary tags;

DETAILED DESCRIPTION OF THE DRAWINGS

Figure 1:
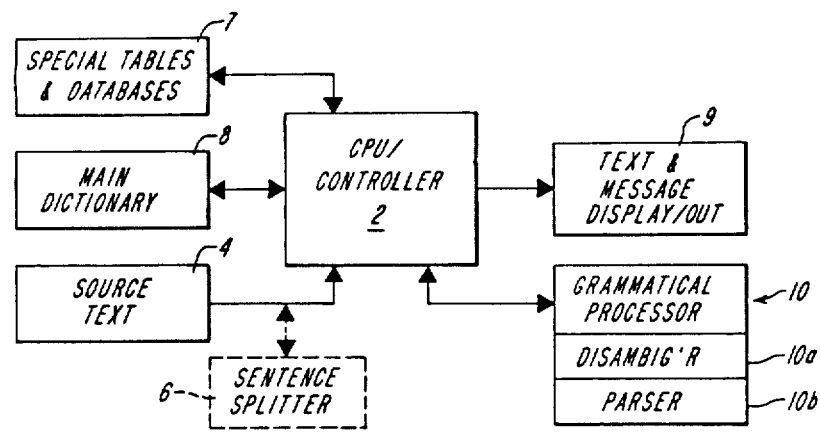
FIG. 1 is a block diagram of a system according to the present invention.

FIG. 1 shows a block diagram of a grammatical analyzer according to the present invention having a CPU/controller 2 which may, for example, be a general purpose computer such as a micro- or mini-computer. The computer receives input text 4, e.g., from keyboard entry, a communications link, or a data storage device, and, if necessary, runs a sentence splitter 6 which partitions the text into sentences for grammatical analysis. Alternatively, the system may receive as input discrete sentences of text or encoded text with sentence boundary markers already inserted. Sentence splitting per se is known in the art, and is used, for example, in commercially available systems for deriving word-per-sentence and similar statistical information in computerized readability analysis systems. A suitable sentence splitter is disclosed in the copending patent application of Henry Kucera, Rachael Sokolowski and Jacqueline Russom filed June 6, 1986 as Ser. No. 872,094, entitled Method and Apparatus for Text Analysis, now issued as U.S. Pat. No. 4,773,009, which application is hereby incorporated by reference and made a part hereof.

The controller 2 then passes each sentence to a grammatical analyzer 10 which annotates each word of the sentence, by reference to a stored word dictionary 8, and preferably several special databases or tables 7, as discussed further below, so as to produce an annotated sentence structure. The annotated sentence, or partial parses thereof and error messages or "prompts" are displayed on display 9.

According to one aspect of the invention, the dictionary includes a record for each word which contains a list of "tags", each tag encoding a syntactic or inflectional property of the word, and which also includes a listing of special features used in the grammatical processing.

The processor annotates the sentence with this information. It then utilizes the stored information to perform two, roughly sequential, operations on the annotated sentence structure. First, a collocational tag disambiguation processor 10a applies an empirically-compiled probability-like function defined on adjacent pairs of syntactic tags to determine a unique sequence of tags (one for each word) corresponding to the most probable parse of each ambiguously-annotated word in the sentence. The disambiguation processor also identifies alternative tags of relatively high probability. Next, a grammatical processing module 10b operates on the identified tags to develop a parse of the sentence.

A prototype text annotator embodiment was created having a main dictionary with 28,223 80-byte records, each record containing the complete grammatical information for a given "word" which is either a base form or an irregularly inflected form. These records were of three types, marked by a record type-code in column 80 to identify the types as "normal" (column 80 blank), "exception" ("$" in column 80) or "contraction" ("+" in column 80). Normal records correspond to the words with non-merged tags and (if they are nouns or verbs) regular inflections; exception records correspond to the words with non-merged tags that are members of an irregular (noun or verb) paradigm (these words may also be members of regular paradigms or uninflectable tag groups); and contraction records correspond to the words with merged tags (that is, tags that contain a "+", indicating that the corresponding word is a contraction of some type).

FIG. 2 is a listing of the tags used in the prototype embodiment, each of which is represented in the drawing by a one to three character mnemonic and also by a one to two digit tag code. There are ninety-two such tags, although any given text word will generally have between one and six possible tags. Each tag indicates a possible syntactic use of the word, or an inflection. The dictionary records may also include, for nouns and verbs, certain information encoding word features such as its number agreement behavior.

FIGS. 3A-3C show examples illustrating the format of the normal, exception and contraction records of the prototype dictionary discussed above. The records each include the retrieval form of the main dictionary entry, left-justified with blank fill in columns 1-25 as field one, and the record type code discussed above as the last entry in the last field at column 80.

FIG. 3A contains examples of "normal" main dictionary records. Normal records comprise approximately ninety-five percent of the database, and contain five fixed-format fields, which include, in addition to fields one and five described above, the following.

Field two contains noun base form inflection code information, if the base word has a noun form, for the word in field one, and occupies columns 26 through 29. These code bits enable the construction of any desired inflection from the stored base form, by use of an inflectional synthesis coding scheme discussed further below.

Field three contains the verb base form inflection code information, if the base form has a verb form, for the word in field one, and occupies columns 30 through 33; these code bits compactly encode the verbal inflections corresponding to the base word.

Field four contains all other syntactic tags for the word in field one, as well as any noun or verb feature annotations, and occupies columns 34 through 77; further information concerning the feature annotations that may appear in this field is given below in the discussion of parsing and noun phrase determination.

As noted above, noun and verb codes, if either occurs at all for a given word, are confined to the fields before column 34; all other tags must occur starting in or after that column. For example, "back", the tenth word in FIG. 3A, is encoded as being both a noun and a verb, both of inflectional class one, yielding the paradigm [back, back's, backs, backs'] for the noun usage and [back, backs, backed, backing] for the verb, as well as an adjective and an adverb (with tag codes as "JJ" and "RB", respectively). Although, including inflectional variants, this accounts for six different words (ten different word-plus-tag pairs), only one record (that corresponding to the base form; i.e., "back") is stored in the database; all of its inflectional variants are recovered by an analysis/synthesis procedure, called "unflection/inflection".

Inflection coding is a method of compactly encoding an electronic dictionary so as to recognize, derive and construct inflectional variants of stored base forms. It permits a relatively small dictionary to provide recognition and spelling verification information, as well as, in this invention, information for the synthesis of inflectional forms and for grammatical processing. One unflection/inflection processor is described in detail in copending patent application Ser. No. 750,911 filed July 1, 1985 and entitled "Method and Apparatus for the Electronic Storage and, Retrieval of Expressions and Linguistic Information", now issued as U.S. Pat. No. 4,724,523, of inventor Henry Kucera, which application is hereby incorporated by reference. Its operation is further described below, by way of completeness, in connection with FIG. 6.

In compiling the dictionary, if an inflectional variant is a base form in its own right, it is listed separately in the database with the appropriate code for this usage. For example, "backing" is stored as a noun of inflectional class one, denoted N1, representing the paradigm [backing, backing's, backings, backings']. This dictionary entry is in addition to its inflectional usage as the present participle of the verb "to back"] which would be recovered by inflection from the base form "back" discussed above.

FIG. 3B shows examples of exception records. These records contain elements (either base or inflected forms) that are members of irregular nouns or verb paradigms. In these records, the format of fields one to five are similar to those of normal records shown in FIG. 3A, except that field four contains one or more substrings delimited by parentheses. The material between parentheses identifies an irregular tag and the appropriate base form for processing for such tag.

FIG. 3C illustrates contraction records, which lack the fields two through four of the foregoing two record types, and instead have a field two which contains from one to five merged tag representations (stored starting in columns 26, 36, 46, 56, and 66, respectively), and occupies columns 26 through 77. The last field, as with the other two types of records, contains certain special processing annotations, and occupies columns 78 through 80; in the prototype, the only codes that occur in this field are the record type-indicating codes that occur in column 80. The illustrated record for the word "ain't" indicates that it is a recognizable contraction with a tag string consisting of the auxiliary tags corresponding to the set of words ("am", "is", "are", "has", "have"), plus the negation marker "*" corresponding to the morpheme "n't".

As noted above, the main dictionary is a dictionary of base form records each listing codes indicative of grammatical and inflectional tags and feature information. Each text word is processed by an "unflection" procedure which operates on the word to identify its base form by stripping suffixes therefrom if possible to produce a probable base form, and looking up the probable base form in the dictionary. When the probable base form is found, the processor inspects inflectional codes of the base form to confirm that any stripped suffixes were indeed legal suffixes of the found entry. The appropriate tags of the found word are then loaded into a data structure, denoted a sentence node or SEN NODE, which represents that word for subsequent processing. In a prototype embodiment, each noun base form in the dictionary is encoded according to one of four regular inflectional paradigms, denoted N1-N4, or a partial or defective paradigm. Each verb base form is encoded according to a regular verbal paradigm, denoted V1-V4, a modified paradigm V1$d$, V2$d$, or V4$d$ with a doubled consonant, or a partial or irregular paradigm. These noun and verb inflectional paradigms encoded in the prototype system are described in greater detail in Appendix A$_0$ attached hereto and entitled Encoding of Inflections.

Figure 6:
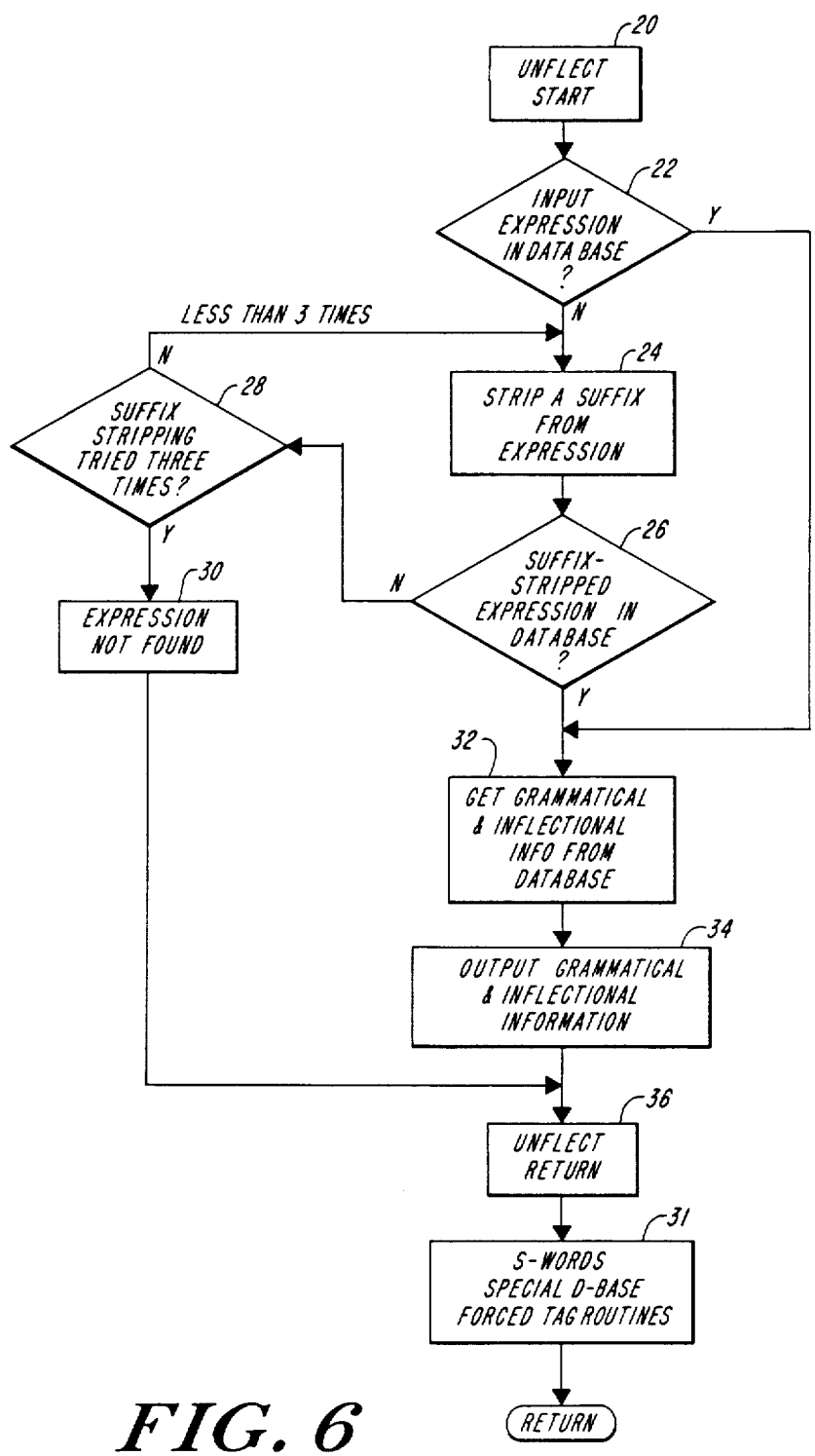
FIG. 6 is a flow chart of a word tag annotation processor.

FIG. 6 shows the overall "unflection" processing for looking up a word of the text in the dictionary to provide basic grammatical information annotations. This figure corresponds in major part to FIG. 7 of the aforesaid patent application, Ser. No. 750,911, described in detail for the embodiment disclosed therein.

As shown in FIG. 6, on entry at 20 the unflection processor takes an input word and checks at 22 whether the identical expression is in the dictionary database. If so, it proceeds at step 32 to retrieve the associated tags and inflectional class codes from the dictionary record and, at 34, to insert these annotations in a processing record for the word of the sentence. This processing record is denoted SEN-NODE, and is a data structure which receives the data annotation, such as tags and feature bits, which are initially retrieved or subsequently developed during processing.

If, on the other hand, the identical word is not a dictionary entry, then a loop 24, 26, 28 is entered in which the processor strips an inflectional suffix, looks up the remaining root (or a transformation thereof) in the dictionary, and, if it finds a matching dictionary base form, retrieves and outputs the associated tags and codes. In addition, for words (denoted "expressions" in the Figure) which do not yield a dictionary-listed base form, additional processing is performed at step 31 to create a provisional "dictionary record" which includes a dummy base form and a list of likely tags for the word. The various types of additional processing are denoted by "S-Words", a processing module which recognizes certain classes of words which, from their morphology, appear created by affixation; "forced tag routines", a collection of processing modules which recognize other special classes of words or assign tags by default; and "special databases". The special databases may, for example, include special listings of nonsense words, idiomatic expressions, proper nouns, or technical words peculiar to the document or user, which have not been integrated into the main dictionary.

These special extensions and the unflection processor together constitute a morphological analyser which provides tag and feature annotations for substantially all words, likely to be encountered in the input text.

The basic unflection processor, denoted GcsUnfl, operates as follows.

In broad terms, first, it removes possible inflectional endings (e.g., "s", "ed", "ing", etc.) from the end of an input text word, and then checks the GCS main dictionary to determine if the remainder of the word occurs in it. If a match occurs, then the input word is a possible inflected form of the retrieved word, and the inflectional codes of the retrieved word are therefore checked. If these codes indicate that the retrieved word allows the inflectional suffix that was removed from the input word to be added to it, then the input word actually is an inflected form of the retrieved word, which is thus its base form, and is analyzed as such.

More precisely, the suffix analysis procedure of the GcsUnfl processor proceeds as follows: (a) if the given text word ends in an apostrophe, then the apostrophe is removed and a special flag is set and (b) a dictionary retrieval attempt is then made on the resulting form. If this form is retrieved, and the retrieval sub-procedures determine it is the base form, then no further analysis is necessary; otherwise the analysis continues as follows: (c) if the word ends in an "s", then only the steps described in paragraph (i) of the below processing are executed; if the word ends in "ed", then only the steps described in paragraph (ii) of the below processing are executed; and if the word ends in "ing", then only the steps described in paragraph (iii) of the below processing are executed. If none of the above is true, then no further inflectional analysis of the word is possible, and the inflectional analysis procedure returns to its calling procedure. In the latter case, other processing steps are applied to generate a tentative tag string for the word by checking the word against special databases, and analyzing it for the occurrence of derivational affixes (described in connection with FIG. 12–13).

The unflection processing is as follows.

(i) If the word ends in an "s" (or "s" followed by an apostrophe, which will be the case if the word-final apostrophe flag has been set by step (a) above), then it might be a singular noun possessive form, a plural noun form, a plural possessive noun form, or a verb third-person singular present-tense form, according to the exact form of its ending, as specified below. The ending analysis procedure proceeds as follows (a) remove the word-final "s" and look up the word; if unsuccessful, then (b) if the current last letter of the word is an "e", then remove it and look up the word; if still unsuccessful, then (c) if the current last letter of the word is an "i", then remove it and look up the word; otherwise (d) if the last two letters of the current form of the word are identical, remove one and look up the word. If in step (b) of the above process, the current last letter of the word was an apostrophe instead of an "e", then the remainder of the algorithm will by bypassed and the word checked to see if it is a possessive form ending in "'s". In all of the above cases, "success" is defined as both retrieving a word and determining that its base form inflectional codes allow the occurrence of the ending in question. This prevents the overgeneration of inflected forms that is often a problem in simple suffix-removal algorithms that do not have the capacity to check to see if a given suffix is legal on a given word.

A simpler process is used in the case of words ending in "ed" and "ing".

(ii) For the former: (a) the "ed" suffix is removed immediately and the resulting form is looked up in the dictionary; if this is not successful, then (b) if the last two letters of the current form of the word are identical, then one is removed and the resulting form of the word is looked up; if this is not successful, then (c) if the current last letter is an "i", then it is replaced by "y" and the resulting form looked up in the dictionary. If this is not successful, then (d) the "y" is changed back to "i" and the algorithm continues by adding an "e" to the end of the word and looking it up in the dictionary. In the above four cases, "success" is defined as it is in paragraph (i) above, with the further distinction that before a word is accepted as an "ed" form, the verb base from codes on its main dictionary record are checked to ensure that it does not have an irregular past tense/past participle form.

(iii) In the case of the "ing" suffix, an algorithm similar to that used for the "ed" suffix is used, with the main differences being: (1) in case (c) the letter must be "y" instead of "i" (and it is changed to "ie" before the main dictionary is checked), and (2) "success" is defined as in paragraph (i) above, and not as in (ii), since the occurrence of irregular past forms does not affect the form of the verb's present participle.

During the above processing the occurrence of "near" successes in matching an input word to a retrieved word is detected (e.g., a retrieved form with the inflectional code "V1" might be recovered when "V1d" inflectional construction is actually required for a precise match). Near successes of this type are recorded so that if an exact match is not obtained for a given input word, an attempt at correction may be made based on th nearly successful match. For example, in the case of the input word "computing", the base form "compute" will match if its code is "V1d" instead of "V1"; since this is the best match, "computting" is corrected to "computing", by modifying its "V1d" code to "V1" and an error message to that effect is printed. "Near Success" is defined rigidly in the current implementation of the program, as a one-feature discrepancy in the retrieved codes within a given word class, so these corrections turn out to be valid in virtually all cases. The construction of error messages is accomplished by indexing a particular type of detected error to a generic error message for that type of error, such as "_____ is not a word. You may mean _____. Please correct text."

The processor, having the dictionary base form and feature code, inserts the existing word and a synthesized correction in the blanks and displays the error message.

In order to illuminate the above process, the following examples are presented.

To start with, the most common elements of an English language text (short function words such as "the" and "a", punctuation marks, and auxiliary verb forms such as "is" and "has") fall into the class of words handled most efficiently by the program. Since every word is looked up in the main dictionary without modification when the procedure is entered, these words are found immediately. If a word is found and is too short to be an inflected form of another word (i.e., is a member of the first two classes of common words given above) or has already had a base form assigned by the retrieval process, then GcsUnfl returns to its calling procedure without any further processing. On the other hand, if the word has not been found, or if it has been found, but is long enough and has the terminal characters to be the inflected form of another word, then processing continues in the manner described in the above algorithm.

For example, if the word "bearing" has been entered, then its noun interpretation ("bearing") is recovered immediately, and its present participle interpretation (from the verb "bear", which is also saved as its verbal base form) is recovered after the "ing" suffix is removed during the execution of the first step of the algorithm described above in paragraph (iii). Similarly, if the word "advanced" is entered, then its adjectival interpretation ("advanced") is recovered immediately, and its past tense/past participle form (from the verb "advance", which is also saved as its verbal base form) is recovered during the fourth step of the algorithm described above in paragraph (ii).

This process proceeds as follows. First an unsuccessful retrieval attempt is made for the form "advanc", then the second and third steps of the algorithm are bypassed (since "advanc" does not end in a doubled consonant or the letter "i"), then "e" is added to "advanc" and a main dictionary record is retrieved corresponding to this word. Once this record has been retrieved, it is checked for the occurrence of a verb base form that has an inflected form ending in "d"; since there is indeed such a form, the additional verbal interpretation of "advanced" noted above is added to the existing adjectival interpretation. The main dictionary record corresponding to "advance" also has a noun interpretation (in inflectional class one) and an adjectival interpretation ("advance", as well as "advanced" may be used as an adjective), but since neither of these interpretations has an inflectional variant formed by the addition of "d" to the base form, they are ignored during this particular retrieval.

Note that if a word like "creed" is entered, the only legal interpretation is as a noun base form; the "-ed" ending, in this case, is not inflectional, but is actually part of the base form. As can be seen from the algorithm description of the GcsUnfl procedure, three probes are made into the GCS main dictionary in this case: (1) with the test form "creed", which results in the retrieval of its usage as a noun base form; and (2) and (3) with the test forms "cre" (suffix "-ed" and "cree" (suffix "-d"), which each result in no retrieval. Even though this process involves two unsuccessful probes into the GCS main dictionary, it is necessary because of the occurrence of words such as "agreed", where the first probe will obtain its adjectival usage and the third its usage as the past tense form/past participle of "agree", and normal verb past forms such as "abandoned", where the first probe will obtain its adjectival usage and the second its usage as the past tense form/past participle of "abandon" (since both probes are successful, no third probe is made, since once the second retrieval has been successful, there is no English verb base form that will fit the description necessary for the third retrieval to be successful as well).

After GcsUnfl has returned to its calling procedure, any text word which is identical to its base form, or is a inflection formed by adding "s", "s'", "ed" or "ing" will have been looked up in the dictionary, and its possible tags will have been ascertained from the dictionary records.

As noted above, in the prototype embodiment of a grammar processor according to the invention, the unflection and dictionary look-up processing just described are supplemented with further special processing and look-up procedures in one or more special dictionaries to provide tag annotations for a greater class of text words than appear in the main dictionary entries. For the moment, for clarity of illustration, it will simply be assumed that, at this stage, each word of the text has been annotated with a string of its possible tags and its corresponding base form.

In addition to the annotation of words of a sentence with tag numbers, certain feature annotations of elements that may operate as the head of a noun phrase, and of elements that can only occur in a non-head position in a noun phrase are preferably included in the dictionary records. These annotations encode the "rank" which characterizes the order of pre-nominal occurrence of a pre-nominal word within noun phrases, and also encode features such as the number or gender behavior of nominal words. Such feature bits may be used in a grammar processor, for example, in the construction of, or recognition of noun phrases. For the present, it suffices to point out that for a complete grammatical analyser the dictionary entries preferably contain, and the processing records are constructed to contain, coded noun phrase rank and added feature bits for nominal and pre-nominal elements in addition to the word tags. Alternatively, the processor may include a mechanism for assigning such rank and feature information based on other stored or derived data.

Preliminary Disambiguation of Tag Strings

As indicated above, a preferred grammatical analyzer according to the invention first annotates each word of a sentence with the main dictionary information as described above. Many words of the sentence will receive a single tag. For example, in the sentence "John wants to sell the new metropolitan zoo animals." the words "John", "the", "new", "metropolitan" "zoo", and "animals" are unambiguously tagged NP, AT, JJ, JJ, NN, and NNS to indicate their sole interpretations as proper noun, article, adjective, adjective, singular common noun, and plural common noun, respectively. Each of the words "wants", "to" and "sell", however, receives two tags as follows wants . . . NNS, VBZ as the plural of the base form noun "want", or the third person singular present tense of the verb to . . . IN, TO as the preposition or the infinitival "TO"

sell . . . VBI, VBP as the infinitival or the non-third person singular present tense verb.

Thus, the number of possible tag strings obtained by selecting one of the possible tags for each word of the sentence is eight, and in general is obtained by multiplying together the number of possible tags for each word of the sentence.

This number may escalate rapidly. For example, the sentence "John wants to sell the new metropolitan zoo all his cleverly trained and brilliantly plumaged parakeets.", which is obtained by replacing "animals" with a long noun phrase, introduces twenty four possible tag strings for the words of the noun phrase, making the total number of possible assignments of tags to the sentence $(8) \times (24) = 192$. FIG. 5 shows the tag annotations for this sentence.

In processing stage 10a which applicant calls "disambiguation processing", this large number of possible tag assignments to the sentence as a whole is processed by essentially probabilistic means, to determine, for each maximal ambiguously tagged string of words, a "most probable parse" (denoted MPP). With a substantial range of ambiguity thus eliminated, the sentence, annotated with the MPP of each word, is then further processed by stage 10b, which may be a conventional grammatical processor, so as to identify correct grammatical structure. This is done as follows.

The sentence is broken down into one or more strings of ambiguously-tagged words commencing and ending with an unambiguously-tagged word. Such a string of n words $W_1 \ldots W_n$ has many possible tag annotations with word $W_i$ having a tag string with possible tags $T_{ii}$ $|1 \leq j \leq m_i|$. For a word $W_i$ having a unique tag, $m_i = 1$ and no winnowing of possible tag assignments is necessary.

However, by selecting one tag for each word $W_i$ of the sequence of words $W_1 \ldots W_n$, one obtains $$\nu = \prod_{i=1}^{n} (m_i)$$

possible sequences $X_k$ of n tags. This number grows exponentially when the words have multiple tags, and the first stage disambiguation processor operates to select out a subset of these possible sequences.

Of the $\nu$ possible tag sequences, a single sequence $X_c$ is selected as most probably correct by defining a local probability-like distribution (called a $\phi$ function) on pairs of adjacent tags to represent the propensity of co-occurrence of the adjacent tags, and by extending this function to a function defined on tag sequences, $\Psi(X_j)$. The values of $\Psi$ on all possible sequences $\{X_k\}$ $1 \leq k \leq \nu$ then determine a probability-like function P defined on the set of sequences $X_j$ where $$P(X_j) = \frac{\psi(X_j)}{\Sigma \psi(X_j)} \ j = 1 \ldots \nu$$

The function $\phi$ is determined as follows. A statistical analysis of the one-million word Brown Standard Corpus of Present-Day American English, Form C (the grammatically-annotated version, henceforth referred to as the "Brown Tagged Corpus" or "BTC") has determined the frequency of occurrence of each tag as well as the frequency of occurrence of each tag in a position syntactically adjacent to each other tag. By syntactically adjacent is meant adjacent except for the possible occurrence of one or more intervening words, such as adverbs, which for purposes of syntactic analysis may be ignored. This frequency of occurrence of a tag U is denoted f(U). Occurrences of a tag V syntactically adjacent to a tag U (denoted $\widehat{UV}$) are also tabulated to determine the frequency $f(\widehat{UV})$ of such occurrence. Then, under fairly reasonable assumptions on the nature of the BTC database and the set-theoretic partition imposed on it by the criterion of adjacent occurrence, the function $p(V|U) = f(\widehat{UV})/f(U)$ defines a conditional probability function, i.e., the probability of tag V co-occurring with U, given U. Applicant has empirically modified this conditional probability function to produce the $\phi$ function defined as $\phi(UV) = f(\widehat{UV})/f(U)f(V)$ which corrects for the relative frequencies of occurrence of the individual tags U, V, and thus produces a function defined on pairs of tags the value of which, although not strictly a probability function, represents their likelihood of co-occurrence or, intuitively, their strength of attraction. This $\phi$ function thus represents the tag collocation probability for pairs of tags.

Appendix A₁ attached hereto is a representative listing from the $\phi$ function compiled by applicant showing the form of the collocation matrix. It is defined on pairs of tags, and thus has the form of a $92 \times 92$ integer-valued "tag collocational probability matrix" (TCPM). This matrix is implemented in applicant's preferred disambiguation processor as a look up table, so that despite the complexity of its derivation, no arithmetic operations or lengthy computations need be performed in computing the $\phi$ values.

This binary function $\phi$ on adjacent tags $T_{iy_i} T_{(i+1)y_{i+1}}$ of words $W_i, W_{i+1}$ is extended to a weight function $$\psi_1(X_j) = \prod_{i=1}^{n-1} \phi(T_{iy_i}, T_{i+1,y_{i+1}})$$

where $X_j = \{T_{1y_1} T_{2y_2} T_{3y_3} \ldots T_{ny_n}\}$ is a sequence of tags with each tag $T_{iy_i}$ being a tag selected from the tag string of the corresponding word $W_i$ of the sequence of words.

Since the $\phi$ and $\psi_1$ functions are tag-dependent only, rather than word-dependent, a straightforward application of the above formalism may assign a high $\psi_1$ value to a sequence of tags which, although empirically likely, does not correspond to a reasonable set of tags for the particular words actually occurring in a sentence. Accordingly, a further function $\psi_0$ is defined which corrects the $\phi$ value for particular words by dividing by a correction factor $C(W_i|^{T}iy_i)$, to reflect the fact that the word $W_i$ whose tag $^{T}iy_i$ is being evaluated occurs with that tag with greatly reduced frequency in the BTC. For example, the tag string for the word "will" contains four tags ("MD" (modal auxiliary), "NN" (singular noun), "VBI" (infinitive verb), and "VBI" (present tense, non-third-person-singular verb form)—however this word is almost always used as a modal, with its nominal usage being a distant second, and its verbal usages being even less probable (to give some figures, based on an analysis of the Brown Tagged Corpus: f(will|MD)=2,138 (95.32%), f(will|NN)=104 (4.64%), f(will|VBI)=1 (0.04%), and f(will|VBP)=0 (0%). Words such as "will" having an extreme variation in the frequency of occurrence of their possible tags are stored in a special "reduced probability table" or "RPT" data base which lists the divisors $C(W_i|^{T}iyi)$ for each reduced probability tag $^{T}iy_i$ of a word $W_i$. Specifically, for such words the corrected weight function $$\psi_d(T_{1y1}, T_{2y2} \ldots T_{nyn}) = \prod_{i=1}^{n-1} \frac{\phi(T_{iyi}, T_{i+1,yi+1})}{c(W_i/T_{iyi})}$$

is evaluated on the string, where the divisors $c(W_i|^{T}iy_i)$ are obtained by accessing the RPT data base. In the database, each entry includes a word, followed by a two digit number between one and ninety-two representing each reduced frequency tag, together with a divisor between two and two hundred fifty five approximating the reduced frequency of occurrence factor of each listed tag.

The RPT database was compiled by counting the number of occurrences of each tag of a word in the BTC or, if the word may legally have a particular tag, but does not happen to occur with that tag in the BTC, setting the frequency of occurrence of that tag arbitrarily to one. The total number of occurrences of all tags for a given word was determined, and a reduction factor computed for each tag occurring substantially less frequently than the mean.

In the preferred embodiment, each word which has been identified as having tags which occur with a reduced frequency has an RPT indication in the main dictionary, which prompts the processor to look up its associated RPT index value. The index value points to an entry in a separate table, denoted the RPT table, which stores patterns of reduced frequency of occurrence for each tag. Preferably, the table for a set of n tags associated with a base form contains less than n pairs, each pair consisting of a tag and the reduction factor associated with the tag. Implicitly, a tag of the word which does not occur in the table is not reduced in frequency.

The RPT processing proceeds as follows. When the base form of a text word has been determined, its dictionary entry is checked to determine whether it has an RPT index. If so, the index is applied to retrieve its RPT pattern, which consists of a set of tags with tag frequency reduction factors, from the RPT table. For each tag of the word which has been identified, the corresponding reduction factor, if any, is applied in the calculation of the tag string collocational probability.

By way of example, the word "run" has an index number which identifies an RPT entry with the following pairs:

| TAG | REDUCTION FACTOR |
|---|---|
| 48(NN) | 1 |
| 83(VBI) | 4 |
| 84(VBN) | 4 |
| 85(VBP) | 1 | and the word "fast" has an index for accessing an entry with the following tags and reduction factors

| TAG | REDUCTION FACTOR |
|---|---|
| 43(JJ) | 1 |
| 48(NN) | 32 |
| 72(QL) | 32 |
| 74(RB) | 1 |
| 83(VBI) | 32 |
| 85(VBP) | 32 |

The function $\psi_0$ defined above, using the collocation numbers $\phi(T_iT_{i+1})$ corrected for words in the RPT database, is the $\psi$ function discussed above which assigns a number to each ambiguously tagged tag sequence $T_1 \ldots T_n$. Thus, in the processor 10a each tag sequence is evaluated. The sequence with the highest $\psi$ value is then selected as the (collocationally) most probable sequence, and its tag for each word is then identified as the word's most probable tag. The sentence passes to further grammatical processing stage 10b. In stage 10a, the second and third most probable tag sequences are also identified and saved in the event subsequent processing steps determine the first sequence is an incorrect tag assignment.

Before discussing in detail the construction of a processor for implementing the theoretical tag disambiguation as just described, two further improvements are noted.

First, computation of the $\psi$ function is performed more efficiently by ruling out some strings. Since there are many collocations which are not allowed in English (for example, adjacent modal auxiliaries, tagged "{MD, MD}", the simple expedient of setting to zero each TCPM entry corresponding to such pairs ensures that the $\phi$ value (and the $\psi$ value) of a tag sequence containing such a pair is zero. In the prototype embodiment, this improvement is accomplished by compiling a list of "disallowed collocational pairs", and setting to zero each entry of the collocation matrix corresponding to a disallowed pair. For the present, the list consists essentially of some of the matrix diagonal elements; it may include such other collocations as have been reliably observed to be impossible or of negligible frequency of occurrence.

Second, the computation of the $\psi$ function can be used to detect certain types of text errors. The $\psi$ function value is subject to extreme variation in the event the input text, as commonly occurs, includes the wrong one of a pair of commonly confused words. This variation is used in a preferred embodiment to evaluate the alternative words and to display an error message when the other word of a pair appears to be required. For example, the pair "advice/advise", of which the first has only a noun interpretation and the second has only verbal interpretations, are commonly interchanged in text. Simple typographical errors of transposition cause errors such as the occurrence of "form" for "from" and vice versa. Clearly, to assign a preposition as the only possible tag of "from" when a noun or verb "form" is called for in the text, or to assign a verbal interpretation to "advise" when the noun "advice" was meant, would result in an erroneous parse.

The preferred disambiguation processor solves this problem by employing a database of commonly confused words (denoted the CWW database) which, in addition to containing pairs of the two types illustrated above, may include one or more pairs of inflections of pronouns (e.g. "I/me", "she/her" etc.) which are commonly confused, the usage of which depends on local context, and the interchange of which thus affects the collocational computation. In the preferred embodiment, the CCW database record for each CCW word pair contains listing of the tags of each word of the pair, and an error message associated with it. For example, for the pair "council/counsel" in which "council" may only have noun tag number "48", and "counsel" may may have either the noun tag "48" or verbal tags "83" or "85", the selection of a verbal tag may initiate an error message such as "you may mean "counsel" instead of "council". "Council" is only a noun" "He is a member of the council." "Counsel" may be used as a verb meaning to advise": "We counsel you to go."

The implementation of the CCW processing is straightforward. Each word a CCW pair is marked (e.g., in the dictionary) by a special flag. This directs the processor to a CCW database which identifies the other word of the pair.

When a text word that is in the CCW database in encountered, it is recognized by its flag, and a "tag superstring" consisting of all the tags which are associated with either the actual text word or with its paired CCW word s constructed, together with the necessary extra SEN-NODE structure to copy the inflectional and feature agreement data codes for each word. The disambiguation processor then collocationally analyses all tags of the superstring when computing the $\psi$ values of tag sequences containing the word, and if it determines that a tag of the CCW paired word is most probable, the CCW error message for that situation is displayed. If the user confirms the error, the paired word is substituted and processing proceeds.

With this theoretical background on the construction of the collocation matrix and of the RPT and CCW databases, and their use in the overall disambiguation processing, the detailed operation of a prototype disambiguation processor 10a will now be described with reference to FIGS. 7-10, showing flowcharts of the collocational disambiguation processing.

The basic structure processed during this stage is a pointer based structure termed a disambiguation node and denoted DIS NODE. These nodes are ordered in a linked list. Each node represents a stage in the computation of the distance function on a sequence of tags corresponding to a sequence of words of a sentence, and includes three elements, namely a pointer D LINK PTR to the next disambiguation node in the linked list, a variable DISTANCE, in which is stored the distance function $\psi$ evaluated on the node, and a bit string D TRACE which encodes the sequence of tags associated with the node. Since the tags are numbered from 1 to 93, each tag may be encoded with seven bits. D TRACE is 140 bits long, and each new tag code is left-concatenated with the previous string of tag codes, so that up to 20 tags may be encoded in the D TRACE of a node. In practice, it is only necessary (and most effective) to disambiguate each continuous string of multiply-tagged words between a pair of uniquely-tagged words in the sentence, so DTRACE is large enough to accommodate virtually all constructions encountered in practice.

During processing, two separate linked lists of disambiguation nodes are maintained, corresponding to previous and current processing stages, and denoted the PREV and CUR lists, which are accessed with the pointers PREV PTR and CUR PTR. The disambiguation processor iteratively processes nodes, starting from single tag length nodes, to successively generate tag sequences and evaluate the $\phi$ function, and to sum the $\psi$ function and evaluate $\psi$ values so as to compute the DISTANCE function for each tag sequence.

The output from the disambiguation processor is: (a) a sequence consisting of a single tag for each word in the sentence, each of which has been determined to be the "most probable parse" tag for its corresponding word (given its context) according to the principles of collocational or "first-order" disambiguation discussed above; (b) second- and third-choice tags for words where such tags are available; and (c) where the second- and third-choice tags exist, further information concerning their relative likelihood, i.e., whether or not they can be considered to be collocationally reasonable alternatives to the MPP tags. This determines whether or not they are to be saved for possible further processing.

In order to obtain this output from the tag-annotated word input, the disambiguation processor 10a, referred to herein by the module name of GcsDisl of the prototype embodiment, proceeds as follows.

First of all, the elements of the "current" and "previous" disambiguation-node linked lists are used to encode each pair of collocations between the tags in any two (syntactically adjacent) tag strings. The processor operates on two adjacent tag strings at any given time, so no further structure is needed, and there are only four possible cases for each collocation of any two tag strings: (i) both tag strings are unambiguous (i.e., they each consist of a single tag); (ii) the first tag string is unambiguous, but the second one is not; (iii) the second tag string is unambiguous, but the first one is not; or (iv) both tag strings are ambiguous.

Before dealing with these four cases, the processor eliminates "invisible" words. These are the words (for the present time, only those unambiguously tagged as adverbs or as negation markers) that have no collocational significance. When one is encountered, GcsDis 1 resets the appropriate pointers so the words on either side of it (and consequently their tag strings) are treated as if they were adjacent. After excluding "invisible" words, the resulting strings of ambiguously and unambiguously tagged words are processed as follows.

First of all, if case (i) above occurs (i.e. if there are two adjacent, unambiguously tagged words), there is is only one possible collocational pair, and nothing needs to be disambiguated. The unambiguous tags of these two words are taken to be their MPP tags, and the SCP and TCP (second and third choice) tag slots are set to zero.

On the other hand, if case (ii) occurs (i.e. an unambiguously tagged word is followed by an ambiguously tagged word), this signals the start of an ambiguous sequence. The unambiguously tagged word (using the notation of the formalism discussed above) becomes $W_1$ of this sequence, and its (single) tag $T_{11}$ becomes the sole element in its string of possible tags $\S T_{11}$. Similarly, the ambiguously tagged word is $W_2$ of this sequence, and its tags (denoted as $T_{21}$ through $T_{2m_2}$) become the $m_2$ elements of the tag string $\S T_{2m_2}$. The RPT database is then accessed in order to obtain the RPT divisors (if any) for the tags of $W_2$, and the previous and current disambiguation-node linked lists are set up as follows.

First of all, since $W_1$ is unambiguously tagged, the previous list consists of a single DIS-NODE, which has as its trace element (D-TRACE) the single tag in $\S T_{11}$, and which has as its distance (DISTANCE) the default value 1. Then, since $W_2$ is ambiguously tagged (with $m_2$ tags), the current list consists of $m_2$ DIS-NODES, the $i^{th}$ element of which has as its trace element the tag $T_{2i}$ followed by the ta $T_{11}$. (The trace elements are stored in reverse order of collocation to allow easy access to the penultimate element of each trace, for reasons that will become apparent below), and which has as its distance the $\phi$-value for the collocation of $T_{11}$ followed by $T_{2i}$, which is divided by the RPT divisor of $T_{2i}$ if this number is other than one.

Similarly, if case (iv) occurs (i.e., two ambiguously tagged words occurring adjacent to one another), this signals the continuation of an existing ambiguous sequence. If this sequence is taken to be x elements long, then the first ambiguously tagged word is referenced as $W_x$ of this sequence, and its tag string (consisting of the tags $T_{x1}$ through $T_{xm_x}$) are referenced as the $m_x$ elements of the tag string $T_{Sxm_x}$. Similarly, the second ambiguously tagged word becomes $W_{(x+1)}$ of this sequence, and its tag string (consisting of tags $T_{(x+1)1}$ through $T_{(x+1)m_{(x+1)}}$) supplies the new $m_{(x+1)}$ elements of the tag sequence $\S T_{(x+1)m_{(x+1)}}$. The RPT database is then accessed to obtain the RPT divisors (if any) for $W_{(x+1)}$, and the current disambiguation-node linked list is set up as follows. First of all, since $W_x$ is ambiguously tagged, the previous list already exists (having been created as the result of either a previous iteration of the actions corresponding to case (iv) or of those corresponding to case (ii)), and therefore consists of one or more DIS-NODE's (whose number will be represented in this discussion by z), which have as their trace elements the sequence of tags (stored in last-in-first-out order) that represent the collocations that these DIS-NODE's encode. Then, since $W_{(x+1)}$ is ambiguously tagged (with $m_{(x+1)}$ tags), the current list will consist of $m_{(x+1)}$ times z DIS-NODES, the $i^{th}$ element of which will have as its trace element the ta $T_{(x+1)i}$ followed by some sequence of tags starting with the ta $T_{xy}$ (i.e., an arbitrary tag out of the tag string associated with $W_x$) and ending with $T_{11}$, and which will have as its distance the $\phi$-value for the collocation of $T_{xy}$ followed b $T_{(x+1)i}$, which is divided by the RPT divisor for $T_{(x+1)i}$ (if this number is other than one), multiplied by the distance value stored on the DIS-NODE associated with the $j^{th}$ DIS-NODE, where this ($j^{th}$) DIS-NODE is defined as being the one with the same D TRACE as the $i^{th}$ DIS-NODE, excluding its first element (which is the tag $T_{(x+1)i}$).

Finally, if case (iii) occurs (i.e., an ambiguously tagged word followed by an unambiguously tagged one), this signals the end of an ambiguous sequence. If this sequence is taken to be x elements long, then it is processed like case (iv), with the exception that $M_{(x+1)}$ is known to be equal to one since $W_x$ is unambiguously tagged. Therefore, the current list that results from the application of the algorithm of case (iv) to the previous list can be no longer than that list, and will be shorter if any collocations between an element of the tag string $\S T_x$ and the tag of $W_{(x+1)}$ are disallowed, and the distance values of the nodes on this (current) list are the values that must be checked to determine the ordering (with respect to collocational probabilities) of their corresponding tag sequences.

After the execution of the steps corresponding to the algorithm in case (iv), the resulting linked list of disambiguation nodes is examined to pick out the three nodes with the highest distance value. The "total" distance of the list is also calculated (by summing together all of the distances of the individual nodes), since this total is used for the calculation of probabilities, as described above. Once the three nodes with the greatest distance value have been obtained, (and their corresponding probabilities are calculated), they are stored in the appropriate slots in the SEN-NODE structures corresponding to the words from whose tag strings they were selected, and GcsDisl proceeds to the next sequence. This completes the detailed description of disambiguation processing steps.

Figure 7:
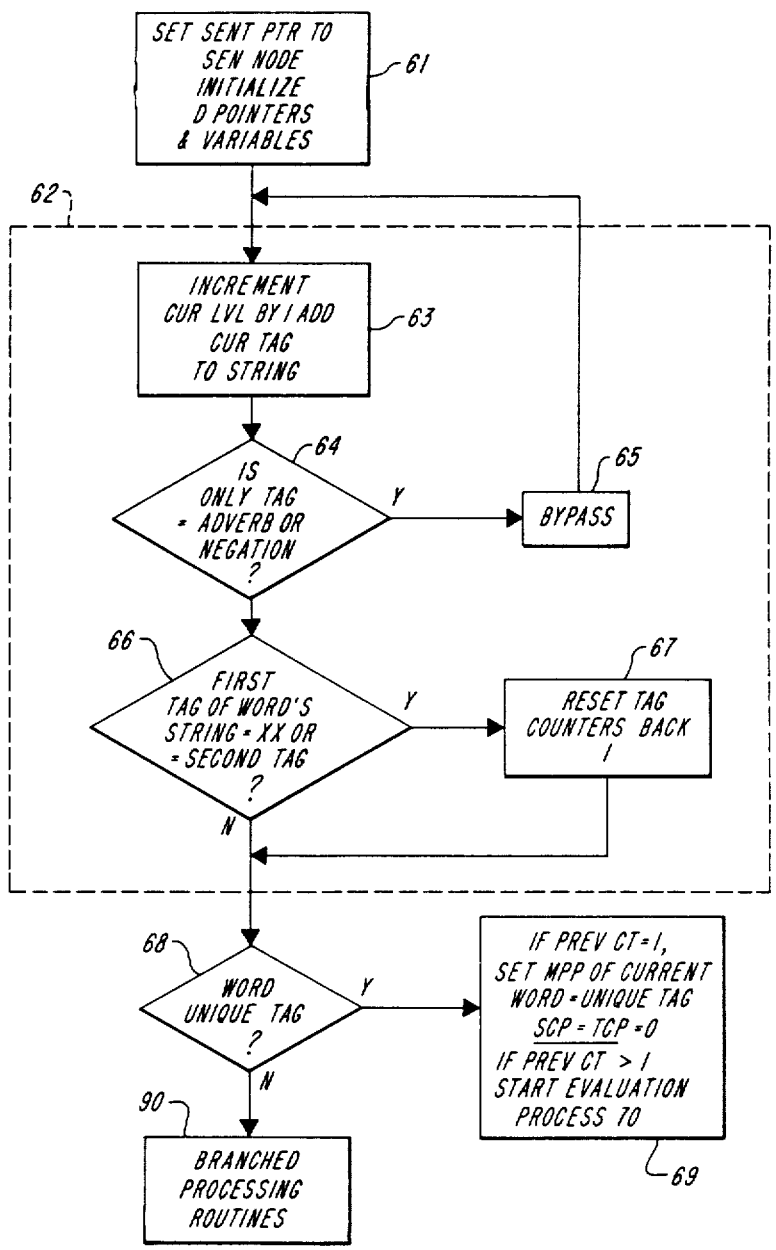
FIGS. 7-10 are flow charts detailing operation of the collocational disambiguation processing.

FIGS. 7-10 illustrate the disambiguation processing portion of the aforementioned prototype embodiment. As shown in FIG. 7, first, the processor at step 61 sets the basing pointer (SN-PTR) for the sentence-information nodes (denoted by their structure name "SEN-NODE") to point at the first element in the sentence workspace linked list. Variables PREV-CT (the number of elements in the previous disambiguation-node list), CUR-CT (the number of elements n the current disambiguation-node list), and CUR-LVL (the current number of tags in the sequence to be disambiguated) are all initialized to one. Various disambiguation-control variables are then initialized as follows: PREV-PTR→D-TRACE (the trace element in the previous disambiguation-node list) is initialized to '0000001'B; and PREV-PTR→DISTANCE (the "distance" value for the first element in the previous disambiguation-node list) is initialized to one.

A loop 62 is then entered which iterates until the value of SN-PTR is equal to the pointer of the SEN-TBL element after the one that points at the "end-of-sentence" marker for the given sentence, thus indicating that all of the elements of this sentence have been processed. On each iteration, a SEN-NODE is processed by the following series of steps. In 63 the value of CUR-LVL is incremented by one, increasing the length of the current sequence of ambiguous tags (if one exists) by adding the current tag under consideration to it.

In 64, the number of tags in the current word's tag string is then checked, and if the word is unambiguously tagged as an adverb or if it is tagged as the negation marker, then a BYPASS sub-procedure 65 is called to bypass it. Control then returns to the beginning of this step. The BYPASS procedure resets pointers as discussed above to make the word invisible to the tag sequence probability analysis, and also sets a bypass counter to create a record of bypassed words.

In step 66, the first tag of the current tag string is checked to see if it corresponds to the special processor internal tag "XX" or if it is identical to the second tag of the string. (The "XX" tag is used as a marker to indicate that the following tag value was tentatively assigned by other than the normal dictionary procedure.)

If either of the cases checked for in 66 is true, then in step 67 the first tag in the string is ignored for the purposes of tag string disambiguation by resetting the tag counters appropriately (and thus avoiding inefficient processing such as treating tag strings of the form "XX TAG", where "TAG" is some legal tag in the system, as being doubly ambiguous, since they are not).

When flow-of-control for a given word reaches this point, then this word becomes "visible" to the main processor of the first-order disambiguation module, and the number of tags in its tag string, excluding any tags eliminated by Step 67, is inspected at step 68.

If there is only one tag in the tag string of the current word, then this word is either the continuation of a sequence of unambiguously-tagged words or is the endpoint of a sequence of one or more ambiguously-tagged words, and it is processed in step 69 in a manner which depends on the number of tags of the previous word. First the value of the counter PREV-CT is inspected to determine which of these two cases holds. If the value of PREV-CT is one, then the previous word was also unambiguously tagged, so the value of the MPP tag for the current word is set to refer to its tag, and the values of the SCP and TCP tags are set to zero, thus indicating no alternative tag reference for these choices.

Figure 9:
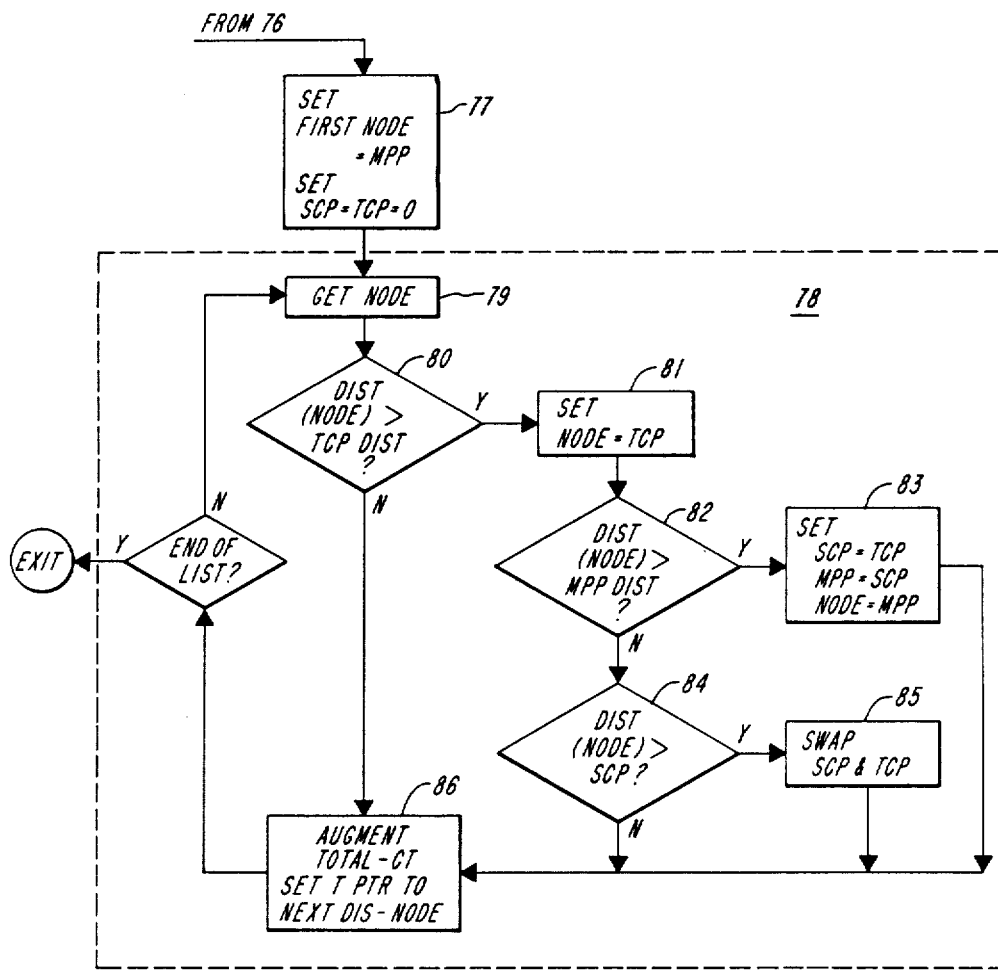
Figure 10:
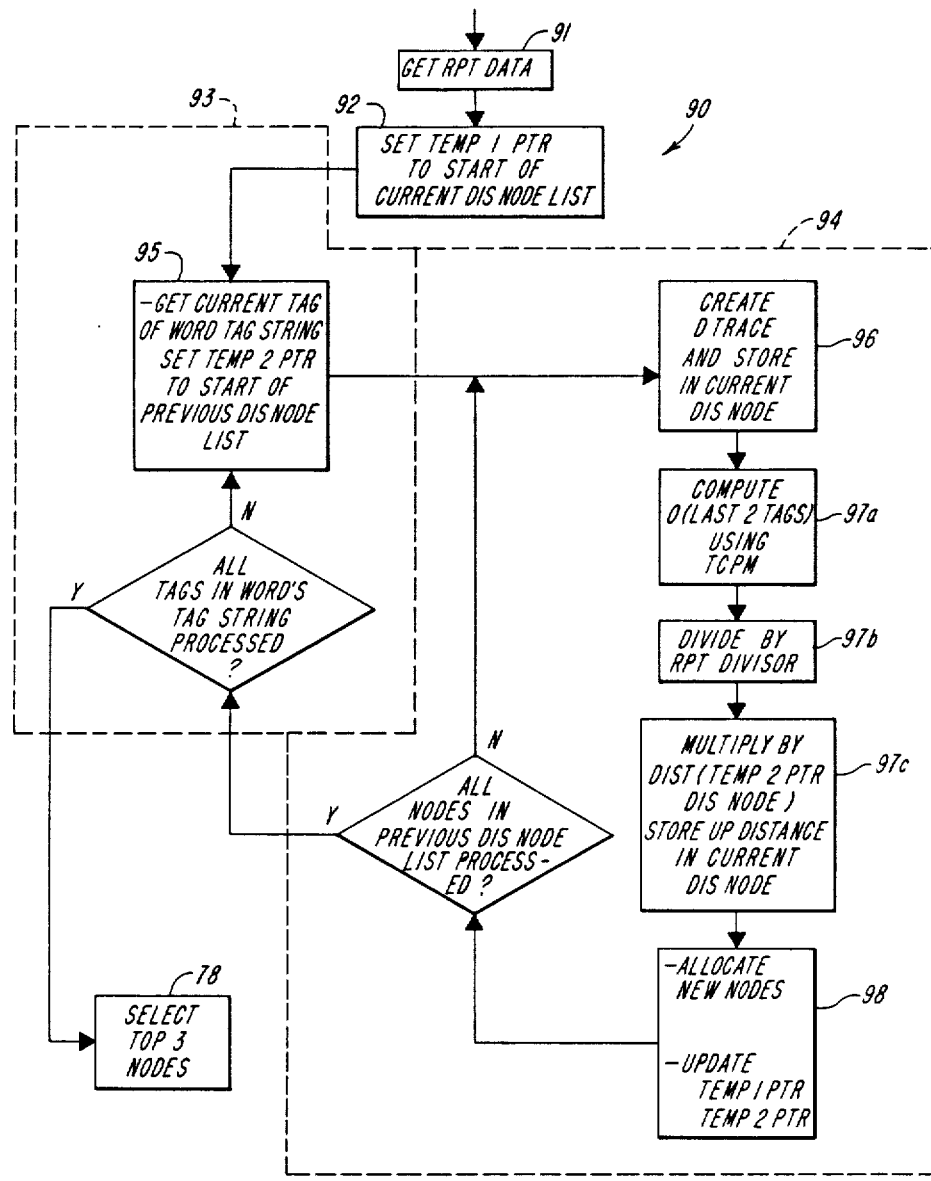

Otherwise, if the value of PREV-CT is not zero, then the current word represents the end of a sequence of one or more ambiguously-tagged words, and therefore signals the start of the evaluation process (FIGS. 8–9) that will determine the MPP, SCP, and TCP tags for these words based on the processes of collocational analysis. Finally, if at step 68 it is determined that the word has plural tags, the more complicated branched processing procedure 90, illustrated below in FIG. 10 is applied.

Figure 8:
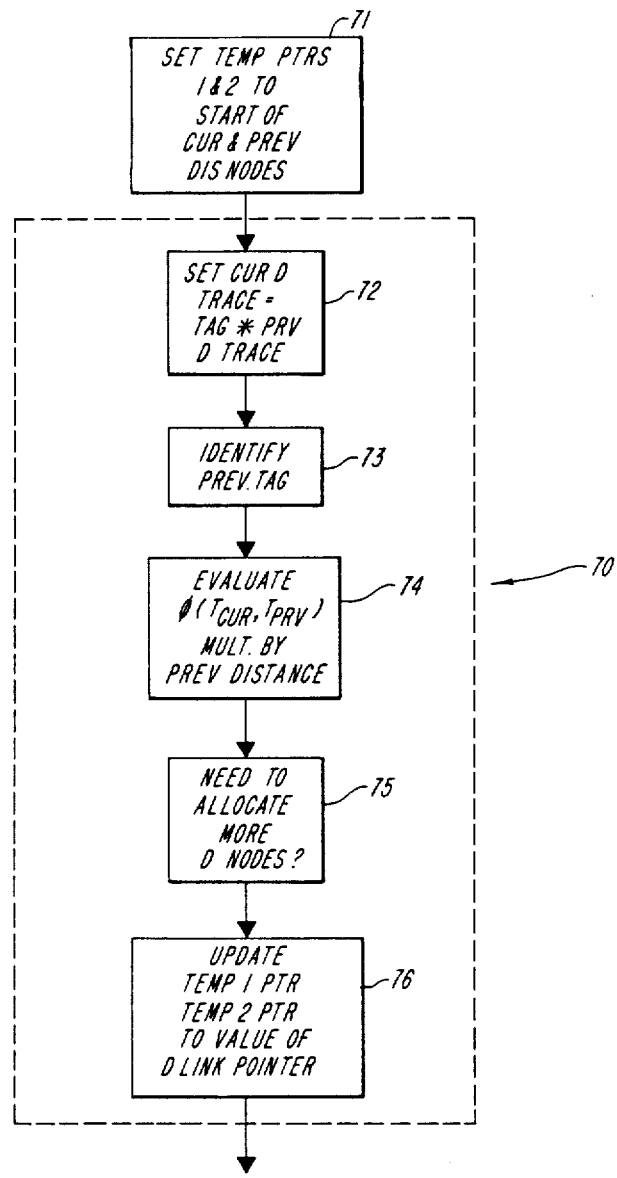

FIG. 8 is a flowchart of the collocational disambiguation processing applied to a disambiguation node when the step 69 of processing indicates its tag sequence has a uniquely tagged current word and a multiply-tagged previous word.

At step 71, processing pointers TEMP1-PTR and TEMP2-PTR are respectively set to point at the first elements of the "current" and "previous" disambiguation-node linked lists (which are respectively pointed at by the externally-defined pointers CUR-PTR and PRV-PTR). The "previous" list is the list that was current in the last iteration of this loop, and contains information that will be written onto the elements of the "current" list, which is not read at all in this iteration, but is the same as the list that was "previous" in the previous iteration of the loop. The algorithm implemented here requires only one level of "look-back", so the storage required for this process is cycled between the two linked lists of disambiguation nodes, by swapping the values of CUR-PTR and PRV-PTR after each iteration of the loop, as described in Step 98 below.

Loop 70 then processes the active nodes, the number of which is stored in the counter PREV-CT, in the "previous" linked list, one node at a time as follows.

First at step 72 the D-TRACE value for the current DIS-NODE, i.e., the element of the "current" linked list that is pointed at by TEMP1-PTR) is set by copying the D-TRACE value for the previous DIS-NODE (i.e., the element of the "previous" linked list that is pointed at by TEMP2-PTR), preceded by the seven-bit code for the current (unambiguous) tag, into TEMP1-PTR→D-TRACE.

Next, at step 73, the identity of the previous tag for the particular tag sequence under consideration at this point is obtained by converting the first seven-bit code in TEMP2-PTR→D-TRACE into a number representing its tag.

The "strength of attraction" value is obtained at step 74 by evaluating the collocational-probability matrix on the current and previous tags, and its value is multiplied by the value in TEMP2-PRT→DISTANCE in order to obtain the "distance" value for the tag sequence currently under consideration, which is then stored in TEMP1-PTR→DISTANCE.

At this point certain housekeeping operations are effected as follows. When the linked lists are initially set up 100 nodes per list are allocated. Since a greater number of nodes may be required, before undertaking further processing at step 75 the forward-linking pointer (D-LINK-PTR) on the DIS-NODE currently under consideration (i.e., pointed a by TEMP1-PTR) in the "current" disambiguation node linked list) is checked to see whether or not it is null; if this is the case, then ten more copies of the DIS-NODEs structure are allocated and are linked onto of the end of the "current" list in order to avoid possible problems with list overflow. Next, at 76, the values of TEMP1-PTR and TEMP2-PTR are updated by setting each one to the value of the pointer stored in D-LINK-PTR on the nodes that they are respectively pointing at, thus moving one node further along each of these linked lists.

When the processing described above in steps 71 to 76 exits, the "previous" and "current" disambiguation-node linked lists will both be of the same length, with the nodes in the latter representing the addition of the current tag as the endpoint of each of the tag sequences encoded on the nodes of the former, and with the "distance" value on each of these nodes updated by the use of the collocational information between the last tag of each of their sequences and the current tag. At this point a sorting loop, shown in FIG. 9, is executed in order to determine the three "most probable" tag sequence, based on their distance information, as stored in the linked list.

Before entry into this loop, however, at step 77 the information on the first node of the "current" linked list is stored as the "most probable parse" (MPP) information for purposes of comparison, and the SCP and TCP information storage variables for the second and third choice parses are initialized to zero. The loop 78 is then executed starting with the second node of the "current" linked list and iterates once per node, processing each one as follows.

The processor gets the current disambiguation node at step 79 and, at step 80 compares the "distance" variable on the DIS-NODE currently being processed to the "distance" of the current TCP sequence. If the current DIS-NODE distance is greater than the TCP "distance", then step 81 replaces it as the new TCP value, discarding the old one. Otherwise control is transferred to 86 below, since the current DIS-NODE, would not be a candidate "Probable choice" parse.

Next, at step 82 the current DIS-NODE distance is compared against the MPP distance, and, if it is greater, at step 83 the current node data replaces that of the MPP sequence. The MPP and SCP sequences are demoted to being the SCP and TCP sequences, respectively.

Otherwise, if the current DIS-NODE distance is less than the existing MPP distance, it is compared against the SCP distance at step 84, and if it is greater than the SCP distance, the processing step 85 interchanges the TCP and SCP data values.

At this point the current DIS-NODE has either replaced the appropriate "probable choice" sequence or has been discarded. From any of steps 80, 83, 85 or the negative determination of step 84, control then passes to the updating process step 86, in which the TOTAL-CT variable (in which is stored the total sum of the "distance" values, which will be used for the calculation of probabilities) is incremented by the "distance" stored on the current node. If the list of nodes has not been entirely Processed, the loop pointer (T-PTR) is set to point at the next DIS-NODE in the linked list (by setting it equal to the value of the D-LINK-PTR on the current DIS-NODE) (if the list of nodes has not been entirely processed) and the loop 78 repeats; otherwise it exits.

After the above loop exits, the tags in the MPP and SCP sequences, as well as in the TCP sequence, if any, have been determined for the current ambiguously-tagged sequence of words. These sequences are then processed further, as follows, to determine the three most probable parses in order and to load their values into storage slots, designated PARSE(1)–PARSE(3), of the SEN-NODE structure.

First of all, the probability of occurrence for the MPP tag sequence is calculated, and the value of PARSE(1) is set to reference the appropriate (MPP) tag for each SEN-NODE corresponding to the words associated with the tag sequence currently being processed.

Next, the probability of occurrence for the SCP tag sequence is calculated, and the value of PARSE(2) is set to reference the appropriate (SCP) tag for each SEN-NODE corresponding to the words associated with the tag sequence currently being processed. Preferably indications of the relative likelihood of the parse choices is also stored at this point. Specifically, if the SCP tag sequence is determined to be less than ten percent probable, or if it less than twenty percent probable and the probability of the MPP tag sequence is more than seventy percent probable, then it is "stacked", i.e., stored with an indication that it's actual likelihood of occurrence is in the designated range. This is done by storing each of the references in PARSE(2) as the negative value of the correct tag reference number, which is otherwise a positive integer. This coding allows in later parsing steps to restrict the processing of unlikely SCP tags to limited circumstances.

Finally, the probability of occurrence for the TCP tag sequence is calculated-if a third choice sequence exists at all—and the value of PARSE(3) is set to reference the appropriate (TCP) tag for each SEN-NODE corresponding to the words associated with the tag sequence currently being processed. As for the SCP tag sequence above, if the TCP tag sequence is determined to be less than ten percent probable, or if it less than twenty Per cent probable and the probability of the MPP tag sequence is more than seventy percent probable, then it is also "stacked", by storing each of the references in PARSE(3) as the negative value of its correct tag reference.

This completes the first-order disambiguation process for the tag sequence currently being processed. The appropriate variables in the disambiguation workspace are re-initialized by setting the external sentence processing pointer to point to the next node in the chain of SEN-NODE's, and swapping the values of PRV-PTR and CUR-PTR; Flow-of-control then transfers back to Step 61.

If steps 69 through 86 above were not executed, however, that is, if step 68 determined that the current word is ambiguously tagged, then a branched processing routine is used to construct and evaluate corresponding disambiguation nodes.

This processing proceeds as shown in FIG. 10. First of all, in step 91, the RPT database is accessed in order to retrieve the RPT information, if any, which is associated with the given word. This information, it will be recalled, includes the divisors which yield the reduced probabilities of occurrence of particular tags of a word's tag string. At 92 the pointer TEMP1-PTR is set to point at the first element of the current disambiguation-node linked list, and a double loop 93, 94 is entered to process the tags in the current word's tag string and create disambiguation nodes corresponding to all tag sequences of a length one greater than the previous set.

The outer loop 93 of the double loop iterates the number of times specified by TAG-CT, which contains the number of tags in the current word's tag string. For each iteration, at step 95, it takes the current tag in the tag string, sets the pointer TEMP2-PTR to point at the start of the previous disambiguation-node linked list, and processes each one of the DIS-NODE's in the previous linked list with respect to the tag currently under consideration, so as to create a node in the current disambiguation-node linked list, as follows.

At step 96 of this process, the seven-bit code of the current tag is determined, and the correct value for D-TRACE string on the current DIS-NODE (which is identifiable as TEMP1-PTR→DIS-NODE) is generated by concatenating this code to the beginning of the D-TRACE string on the previous DIS-NODE under consideration, which is identified by TEMP2-PTR→DIS-NODE, and then storing the result in TEMP1-PTR→DIS-NODE.D-TRACE.

Steps 97a-97c derive the "distance" value associated with the tag sequence under consideration by evaluating the tag collocation probability matrix on the current and previous tags to determine the collocational "strength of attraction" between this tag and the present one. The value of collocational "strength of attraction" is divided by the RPT divisor associated with the current tag. The result of the above calculation is multiplied by the distance value stored in TEMP2-PTR→DIS-NODE.DISTANCE, and the result is stored in TEMP1-PTR→DIS-NODE DISTANCE.

Finally in step 98 the D-LINK-PTR associated with TEMP1-PTR→DIS-NODE is inspected to see whether or not it is null; if it is, then the current DIS-NODE is the last one in the current linked list, and ten more free copies of a NODE structure are allocated and are added to the end of the list, as in step 75 discussed above. Then the values of both TEMP1-PTR and TEMP2-PTR are updated by moving them one element further along their respective linked lists, setting them equal to the value of the D-LINK-PTR on the DIS-NODE that they are currently pointing at; the value of N, which contains the number of the node currently being processed, is incremented by one; a check is made at 99 whether all of the nodes in the previous disambiguation-node linked list have been processed; and flow of control is transferred back to Step 96.

When all of the previous DIS-NODE list has been processed the inner loop exits, and flow-of-control is transferred back to Step 95 unless the outer loop has already processed all of the tags in the current tag string, in which case the double loop processing exits.

On exiting, the current disambiguation node linked list has been completed, and contains a number of nodes equal to the product of PREV-CT times TAG-CT. At this point certain negligible nodes are preferably pruned from the linked list. This is done in the prototype embodiment by identifying each node with a distance value less than 0.001 and re-setting the node pointers to avoid further processing of such nodes.

Finally, the external sentence processing pointer is set to point to the next node in the chain of SEN-NODE's, and the values of PRV-PTR and CUR-PTR are swapped, so that the current disambiguation-node linked list becomes the previous one, for use by the next iteration of the loop, and the nodes of the previous one become available for use in the new current list for the next iteration of the loop.

Control returns to step 61 to proceed with processing of the next sentence node. In this manner all possible tag sequences are analyzed and corresponding distance values calculated, with tag assignments corresponding to MPP, and SCP and TCP assignments derived for each word, together with the coding indicating the relative weights of the three probable parse assignments by the negative tag codes inserted after step 86 as explained above.

After the above steps have been completed, the first-order disambiguation process has been applied to the entire sentence. Preferably, the following "clean up" steps are also executed.

First, if the BYPASS routine, step 65, was evoked, as evidenced by a counter BYPASS-CTR set to greater than one, then at least one SEN-NODE has been removed from the linked list of SEN-NODE's; the clean up processing corrects the current chaining status of this list by linking any bypassed elements back into it.

Next, if any nodes have been pruned from the disambiguation node linked lists, then they are linked back into the current list.

The foregoing processing completes the collocational determination of probable tag assignments in the prototype processor, and results in an annotated data structure upon which a parsing or other grammar processor unit 10b (FIG. 1) operates.

One disadvantage of the foregoing process of iteratively building up a weight function on the set of all possible tag strings is that the number of required disambiguation nodes, or distinct tag strings, which must be evaluated and then summed and normalized before performing the desired probability comparison steps such as the steps 77–85 described above, may escalate quickly. For example, the sentence "Who did Joe say that Dave had claimed that Jim had told to go jump off a bridge?"

has a sequence of fourteen consecutive ambiguously-tagged words, resulting in over one-half million possible tag sequences, for which the corresponding DIS-NODE records require fourteen megabytes of memory. As described above, two sets (CUR and PREV) of nodes are maintained, doubling this machine memory requirement.

Accordingly, in a preferred embodiment of the invention the disambiguation processor employs a node-winnowing procedure to select the three most probable tag sequences at each step as it proceeds with the construction of DIS-NODES, deleting the other previously-constructed nodes. Since each word has at most six possible tags, only 3×6=18 DIS-NODES are thus required to construct each of the CUR and PREV lists of nodes. A fixed memory allocation of 1008 bytes then obviates the processing overhead associated with the allocation of additional nodes described in relation to steps 75 and 98 of the above processing. By maintaining only the subset of most probable strings at each processing step, the resulting distance functions perserve their ordering and relative magnitudes. Thus, relational information, such as that tag sequence A is approximately three times more probable than tag sequence B, or that sequence A has a normalized probability of approximately seventy percent, is preserved.

Figure 11:
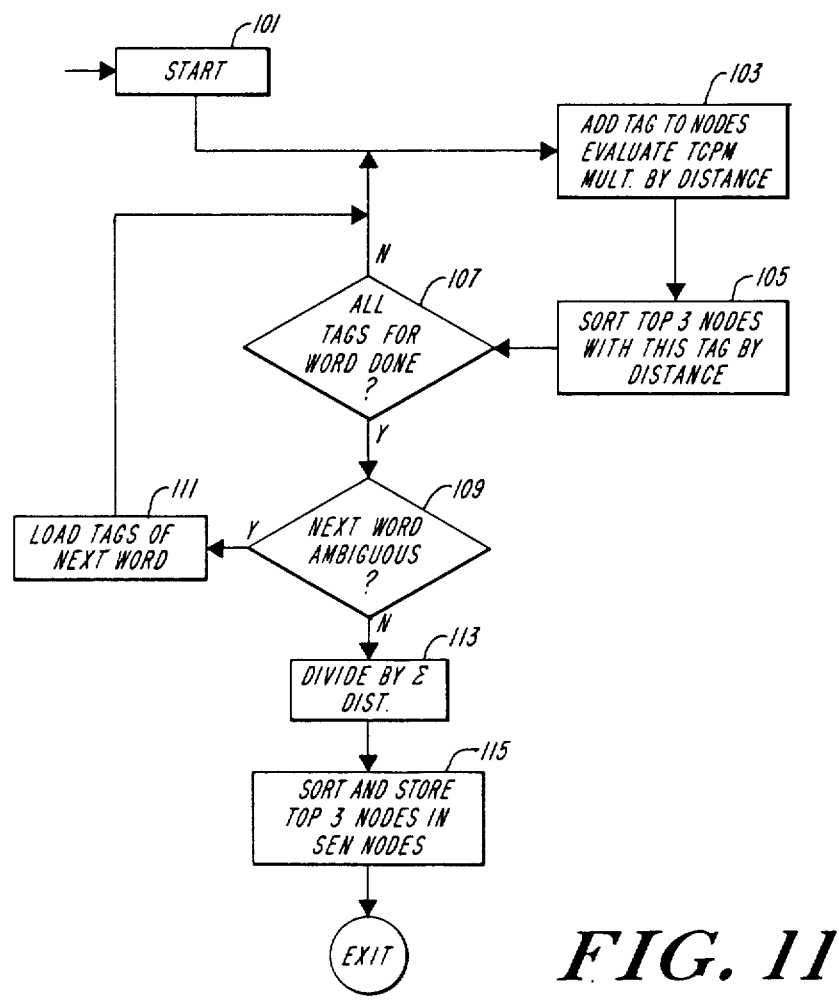
FIG. 11 shows the processing of a general grammatical analyser operative on disambiguated text.

FIG. 11 shows the operation of the improved disambiguation processing 100 according to this preferred embodiment of the invention. The processor initializes processing at step 101 by setting pointers and proceeds to fetch successive tags of a word, bypassing negations and adverbs, and inspecting the tag string of a word substantially as described above in relation to FIG. 7. At 103 it commences the iterative construction of disambiguation nodes by successively adding one tag of a word and evaluating the $\Phi$ function to define a DISTANCE as previously described.

However, once a tag has been added to produce nodes having that tag as last element, and having a length one greater than the previous set of DIS NODES, at step 105 the nodes are sorted by magnitude of their DISTANCE function, and only the top three nodes are retained. At step 107 a determination is made whether all tags of a word have been processed. If not, the steps 103, 105 are repeated, adding the next tag to each node of the previous list and pruning all but the top three resulting nodes for that tag. On the other hand, if all tags of a word have been processed, the stage of constructing current DIS NODE list is completed, and the list will have at most three nodes for each tag of the current word. At 109 a determination is made whether the next (non-invisible) word of the sentence is also multiply-tagged. If so, its tags are provided at step 111 and the node construction process continues to build nodes having tag strings incremented by one tag.

If at step 109 it is determined that the next word is uniquely tagged, thus signalling the end of a maximal length ambiguously-tagged sequence of words, then the current set of maximal length disambiguation nodes is complete, and it is processed to determine the first, second and third most probable tag sequences, and their relative magnitudes.

This is done at step 113, by dividing each DISTANCE by the sum of the (fewer than eighteen) DIS NODE DISTANCE values, and at step 115, which sorts the normalized distances to select the three remaining tag strings having the greatest values. As before, a stacking code indicates whether the values of the TCP and SCP strings are highly improbable, or reasonably probable in relation to the relative probability of the MCP string.

This completes the description of a grammatical disambiguation system in accordance with the invention, wherein each word is tagged, and an determined and short computational process is applied uniformly to all words, and operates on sequences of words to annotate each word with a most probable tag.

A principal use of the system is as a pre-processor for a grammatical text analyser. Conventionally automated grammatical text analysis systems require a processor to iteratively check the possible tags of a word, and the possible sequences of tags of a sequence of words, against a large number of patterns or relational rules. This requires massive computation. By limiting the number of tag choices for each word, and by initially specifying a single MPP tag for each word, a tag disambiguation preprocessor in accordance with the present invention expedites the operation of a grammatical text analyser.

Figure 12:
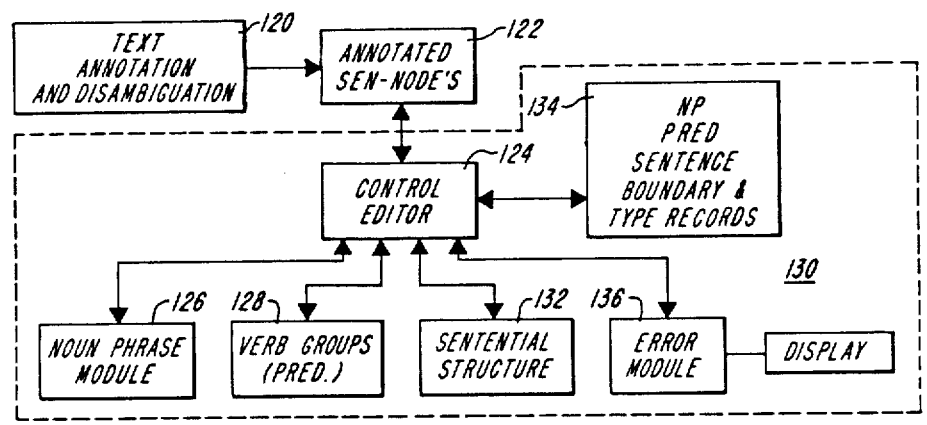
FIGS. 12-13 shows further details of preferred text word annotation processing.

FIG. 12 shows the construction of an exemplary grammatical text analyser according to the invention, in which a disambiguation processor 120 provides a data output including a SEN NODE data structure 122 for each word, with its MPP and other tag and feature annotations. A grammatical analyser 130 then operates under control of control module 124 on the annotated word data to successively build up larger syntactic structures and derive a parse of a text sentence.

In this construction, the disambiguated sentence structure is parsed in three general phases: (a) the identification of the simplex noun phrases (NPs) in the sentence, and if there is more than one simplex NP, their combination, where possible, into complex NPs; (b) the identification of the simplex verb groups (VGs) in the sentence and, if there is more than one simplex VG, their combination, where possible, into complex VGs; and (c) the identification of the simplex sentence(s) in the (matrix) sentence and, if there is more than one simplex sentence their combination (where possible) into complex sentences.

The NP processing 126 of the first phase is accomplished in a double-scan of the sentence. The parser first ascertains NP boundaries by inspecting tagged words and applying ordering criteria to their "rank". This rank, which characterizes a word's functional role in noun phrase construction and corresponds roughly to its order of occurrence in a noun phrase, is determined by inspection of the word's tag. Once the simplex NP boundaries have been identified, the NP processor operates on the simplex NP structures to detect complex phrases which include prepositional phrases, a coordinating conjunction, or certain coordinating constructions. When such a complex phrase is identified, the processor creates a complex NP record which includes pointers to the component NPs and the boundaries of the complex NP, and derives the feature agreement properties (number, gender) of the complex NP.

Once the NP-structure of the sentence has been determined, a predication analyser module 128 is called which inspects the portions of the sentence that are not incorporated into nominalizations, and assigns predicational structure to these portions where appropriate.

After operation of module 128, the apparent predicational structure of the sentence has been determined. Some sentential structure is also determined incident to the predicational analysis, as tentative assignments of subjects and their corresponding finite predications will have been made.

At this point the controller 124 analyzes the higher syntactic structure of the sentence by a clausal analysis module 132 that inspects the tentative sentence-level structures generated by module 128 and either confirms them or replaces them.

The noun phrase and verb group modules each insert boundary markers and provide other data to appropriate registers 134 which maintain the boundary data for phrase and verb groups, and also maintain the derived feature information. This allows concordance rule checking of different syntactic units and permits the clausal analysis module to match related clauses. An error message modules 136, similar to that described for the CCW error messages of the disambiguator, displays error messages when errors of syntax are detected.

This completes the description of the major structural units of a grammar processor incorporating the present invention, and of the interrelation of the various structural units of such processor for annotating encoded text and processing the text to derive precise grammatical information.

It will be recalled that the preliminary annotation of text words with their possible tags was described in connection with FIG. 6 showing the inflection coding procedure. This annotation employs a suffix-stripping procedure, a dictionary look-up procedure, and a tag-driven inflection procedure to identify and confirm each dictionary base form of the text word and its corresponding tag(s) so as to provide the tag annotations of a text word for further grammatical processing.

Figure 13:
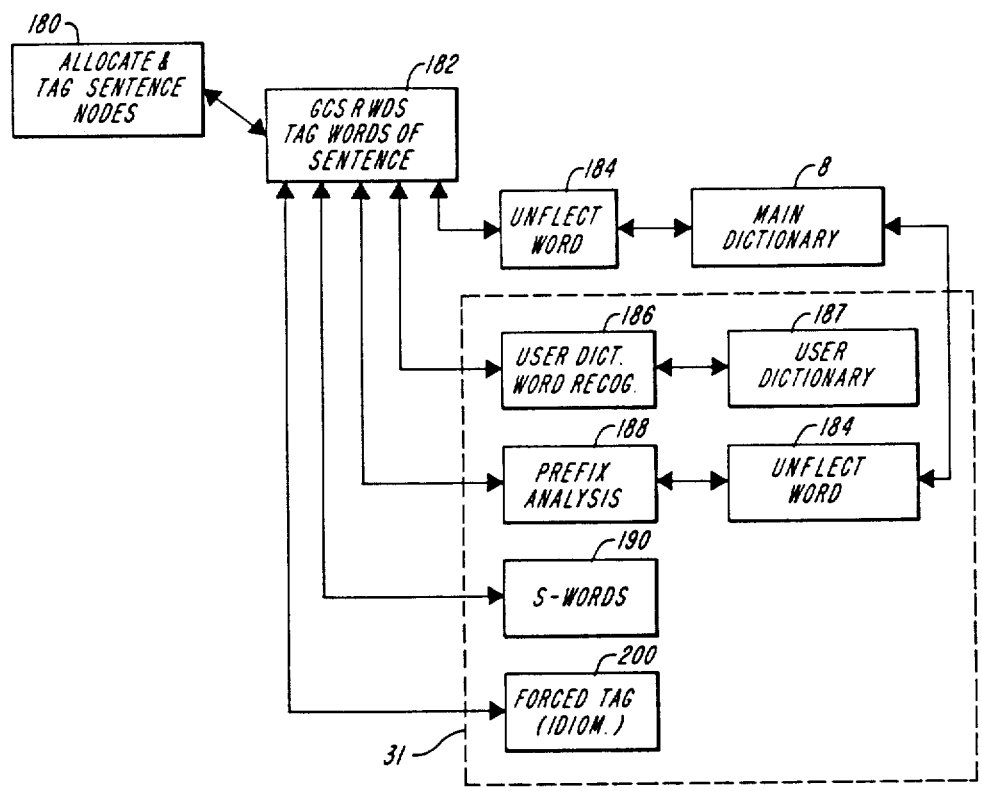

In a further prototype embodiment, this preliminary tag annotating portion of the processor has been extended by the inclusion of additional word-recognizing or -annotating mechanisms, which were indicated in FIG. 6 generally by processor stage 31 under the designation "S-words, Special Database and Forced Tag Routines". FIG. 13 shows in greater detail the interrelationship of these further word-recognition processing units in the further prototype embodiment.

As shown in FIG. 13, a general flow of control program within the processor includes a section 180 which allocates and inserts tag data in an ordered set of sentence node structures. The data is obtained by calling a word-recognition module 182 which, as discussed in detail in connection with FIG. 6, takes successive words of the text and performs an inflection analysis 184 with one or more look-up operations in the main dictionary 8. In addition, when the main dictionary reveals no base form corresponding to the input text word, the recognition module 182 summons one or more morphological analysis or ancillary word recognition modules 186, 188, 190, 200 to identify tag annotations and, where appropriate, base form information for the text words.

These ancillary recognition modules are as follows. First, a special user dictionary 187 is maintained which includes special or technical terms which are entered and accumulated by the user, either for a particular document, or for the user's particular vocabulary, such as a specialized scientific vocabulary. A look-up routine 186 checks whether the given text word appears in the dictionary, and, if so, retrieves its tag and feature annotations.

A second ancillary recognition module is a prefix analyser 188 which inspects the first letters of a text word to recognize and strip common prefixes. The remaining root portion of the word is then subject to inflection processing 184 to determine if the root is in the main dictionary. This processor recognizes words such as "counterterrorist" or "antigovernment", of a type which commonly occur but may not have been included in a dictionary.

A third, and major, ancillary processing module 190 is invoked to analyze words which have not been "recognized" by the processor stages 184, 186, 188. This module, denoted "S-words", performs a number of suffix-stripping operations, distinct from the inflectional suffix-stripping of the inflection processor, to recognize and, where appropriate, annotate certain rare text words. Examples of such words are, e.g., the literal alphanumeric strings "141st", "142nd", "143rd", and "144th" which are recognized as ordinal numbers by the pattern of their last digit and following letters (1, 2, 3, or any other digit followed by, respectively, st, nd, rd, or th). Another example is the recognition of abstract nouns by an ending such as "ness".

Finally, for text words not identified by any of the procedures 184, 186, 190, a forced tag routine 200 is initiated. In the above described prototype embodiment, routine 200 identifies idiomatic expressions and common phrases of foreign-language provenance. This is done by maintaining a table or list of such expressions, each expression consisting of several words which are "bound" to each other, in the sense of co-occurring. If a text word, e.g., "carte" is found to be on the list, a search is made among the sentence nodes for the other words of its idiomatic occurrence "a la carte" or "carte blanche", and if the other words are found in the text, the tags (e.g., as adverb and adjective for "a la carte") are "forced" for the expression and placed in the appropriate sentence node slots.

It should be noted that this forced tag processing for idiomatic and foreign expressions may be implemented in other ways, and the ordering of steps shown in FIG. 13 may be changed in other embodiments. Thus, for example, words such as "carte", "priori" and the like may be stored in the main dictionary with a special flag or other identifier, so that at the first recognition stage the dictioanary look up stage of unflection) the word is retrieved. In that case the flag or identifier triggers special processing. It may, for example, direct the processor, as in the RPT database construction discussed above, to retrieve an index into a table of special data. Thus, it may be used to locate a bound phrase ("a la carte", "a priori") in a table and subject it to processing immediately, rather than following the occurrence of morphological prefix and suffix analysis as indicated in FIG. 13.

The foregoing prototype has been described by way of illustration in part to illustrate the interelation of the invention with various text annotating and grammatical processing units. However, the invention contemplates other and partial systems for grammatical processing, the output of which may be, for example, text having a collocationally-assigned "tag" for each text word, or other output having grammatical information of the text delineated less fully, or with a lesser degree of overall certainty. Several examples of related embodiments of systems according to the invention have been briefly described above with relation to speech/voice transformation systems, preprocessing systems for annotating database text, and selective post-processing to identify syntactically plausible replacement words, or to display messages for spelling correction or data retrieval systems.

The invention being thus described, other examples and embodiments of the invention will occur to those skilled in the art, and all such embodiments and examples are within the spirit of the invention, as defined by the following claims.

APPENDIX $A_0$

Encoding of Inflections

The GCS main dictionary for the encoding of inflectional information. This is done for two main reasons: (1) by encoding inflectional information and having algorithms to (a) analyze inflected forms in order to recover their cases, and (b) synthesize inflected forms from codes associated with their bases, the number of distinct noun and verb forms that need to be stored in the main dictionary may be reduced by a factor of approximately four; and (2) by having access to a full noun or verb paradigm from any one of its members, corrections may be supplied for feature-based errors within a paradigm by an error-free process of straightforward substitution.

Encoding of Nominal Inflections

Regular nouns in English may have up to four forms: (1) singular (computer), (2) singular possessive (computer's), (3) plural (computers), and (4) plural possessive (computers'). The noun "computer" is a member of the most common noun paradigm in English, which will be represented here by the suffix complex [0, 's, s, s'] (with the zero indicating the absence of an ending for the singular (base) form of the noun). This paradigm is referred to in this documentation as "noun class one" and is generally encoded as "N1" (with the GCS-internal representation of '01'B)

Noun class two (encoded as "N2", with the GCS-internal representation of '10'B) is characterized by the suffix complex [0, 's, es, es'], and includes: (1) words such as "abyss" and "lunch" (which end in a sibilant and thus require a plural in "es"); and (2) words such as "potato" and "taxi" (which are required by arbitrary rules of English orthography to end in "es" when put into their plural forms).

As it turns out, some words in class N2 also can take variants from N1 suffix complex, and vice versa (e.g., both "zeros" and "zeroes" are acceptable plurals of the noun "zero"); this type of variation is handled by encoding these nouns as either "N21" or "N12", depending on which is the generally preferred suffix complex for each variant (the GCS-internal code is correspondingly more complex, and is described below).

Noun class three (encoded as N3, with the GCS-internal representation of '11'B) is characterized by the suffix complex [y, y's, ies, ies'], and consists of nouns whose plurals exhibit an "y/ies" alternation with their base forms (generally those nouns with either a penultimate consonant or the "quy" ending; e.g. "try/tries" and "colloquy/colloquies", as opposed to "day/days", and "buy/buys") .

Noun class four (encoded as N4, with the GCS-internal representation of '00'B) is characterized by the suffix complex [0, 's, 0, 's], and consists of noun whose singular forms are indistinguishable from their plural forms; e.g., "sheep." A large number of N4 nouns also have plural variants in another noun class; these are encoded as N41 (e.g., "elk/elks") , N42 (e.g., "fish/fishes") , or N43 (e.g., "fry/fries"), respectively.

In one grammar processing apparatus, the dictionary includes for each noun an ordered sequence of code bits which encode particular agreement, feature or dominance properties, such as number, gender and the like. In a prototype embodiment of the present invention, the bits in positions 12 through 16 of this noun feature string are used to encode inflectional form variants in different classes, as follows: $B_{12-13}$ contains the main inflectional class code, and if $B_{14}$ is set, the $B_{15-16}$ contains the alternate inflectional class code. Thus, for example, the value of $B_{12-16}$ for the noun "computer" (N1) is '01000'B; for the noun "domino" (N21) is '10101'B; and for the noun "fish" (N42) is '00110'B.

The above system handles all of the inflectional information for regular nouns with full paradigms; English includes, however, both nouns with defective paradigms (i.e., lacking either a singular or plural form) and nouns with irregular paradigms (i.e., with forms not fitting into the general inflectional patterns described above).

Concerning defective paradigms, nouns lacking plural forms may all be considered members of noun class one, with the plural elements of the suffix complex eliminated (since the differences between the suffix complexes for the four classes described above appear only in their plural forms). This fact may be represented by the suffix complex [0, 's, X, X] (encoded as N1s); examples of words of this type are "advice", "ado", "alertness", etc. Like the regular noun base forms, these irregular noun forms also have codes stored in positions 12 through 16 of the noun feature string (in this case $B_{12-16}$ contains '01001'B).

Nouns lacking singular forms fall into one of two categories; N4p (characterized by the, suffix complex [X, X, 0 ,'s]) and N1p (characterized by the suffix complex [X, X, s, s']). Examples of words in class N1p are "people" and "townsfolk", and of words in class N4p are "alms" and "scissors." Like the regular noun base forms, these irregular noun forms also have codes stored in positions 12 through 16 of the noun feature string (in this case $B_{12-16}$ contains '00010'B for class N4p and '01010'B for class N1p). In both cases, the value of $B_{15-16}$ indicates that the noun has no singular forms, and the value of $B_{12-13}$ indicates which normal paradigm has the correct plural endings for the given defective paradigm (N4 for N4p and N1 for N1p).

Similar to both N4 and N1p is the paradigm corresponding to most nouns ending in "-ics" (e.g, "logistics", "gymnastics", etc.). This paradigm may be represented by the suffix complex [s, s', s, s'], and is encoded by setting $B_{12-16}$ to '01011'B, which is interpreted as mapping the normal plural suffixed of class N1 onto the singular forms as well; this class receives the special noun class one code of N1x.

Concerning the encoding of irregular paradigms (e.g., "man/men" or "knife/knives", where the singular and plural forms are in general not linked by any easily-defined relationship), an efficient way of encoding these irregular paradigms is to consider them as being the union of two defective paradigms, with the singular forms being form class N1s and the plural forms being from class N4p (thus yielding a composite paradigm of the form "[$R_1$0, $R_1$'s, $R_2$0, $R_2$'s]", where $R_1$ and $R_2$ represent the two irregular roots). These partial paradigms are differentiated from the corresponding defective paradigms by having the first bit of MD-REC.x-FLGS set to '1'B, which indicates that the other half of the paradigm may be recovered from the irregular paradigms' exception dictionary indexed by the root, either $R_1$ or $R_2$, of the half of the paradigm under consideration.

Encoding of Verbal Inflections

Regular verbs in English may have up to four forms: (1) base form (compute), (2) present-tense, third-person singular agreement form (computes), (3) past form (computed), and (4) present principle (computing). These four forms fall into two classes, with the following interpretations: (1) non-finite (a) infinitive (Form 1), (b) past participle (Form 3), and (c) present participle (Form 4); and (2) finite: (a) present-tense, non-third person singular agreement form (Form 1), (b) present-tense, third-person singular agreement form (Form 2), and (c) past tense form (Form 3). Note that Forms 1 and 3 have both finite and non-finite interpretations, while Form 2 must always be finite and Form 4 must always be non-finite.

The verb "compute" shown above is a member of the most common verb paradigm in English, which will be represented here by the suffix complex [0, s, ed, ing]

FIG. 28: Examples of Encoding Nominal Inflections

| Word | Tag | EG | $B_{1-9}$ | Base Form | $B_{12-16}$ |
|---|---|---|---|---|---|
| computer | NN (N1) | 1 | 0–001000 | — | 01000 |
| computer's | NN$ | 4 | 001.0– | computer | 01000 |
| computers | NNS | 1 | 0–001100 | computer | 01000 |
| computers' | NNS$ | 4 | 001.0– | computer | 01000 |
| fish | NN,NNS (N41) | 1 | 0–000–000 | — | 00110 |
| fish's | NN$,NNS$ | 4 | 001.0– | fish | 00110 |
| fishes | NNS | 1 | 0–0011000 | fish | 00110 |
| fishes' | NNS$ | 4 | 001.0– | fish | 00110 |
| man | NN(N41) | 1 | 0–0010000 | — | 01001 |
| man's | NN$ | 4 | 001.0– | man | 01001 |
| men | NNS(N4p) | 1 | 0–0011000 | man | 01001 |
| men's | NNS$ | 4 | 001.0– | man | 01001 |

Concerning the inflection of the base forms encoded by the system described above, if a given word is a possessive form ending in "'s" that has a singular interpretation (thus excluding plural possessives in "'s", like "men's") , then it receives two possible encodings, one as a pre-nominal (feature string '001.0-'B) and the other as a singular noun plus either of the auxiliaries "is" or "has". If the word is any other possessive form, then it receives only the pre-nominal interpretation. If the word is not possessive form, then the value of $B_{5-6}$ indicates whether it is singular ('10'B), plural ('11'B), or neutral with respect to number agreement ('0'B). The "neutral" number code is used for paradigm such as N4 and N1x, where the singular and plural forms are identical, and thus context dependent (e.g., "the fish is/are . . . ").

(with the zero indicating the absence of an ending for the infinitive (base) form of the verb). This paradigm is referred to in this documentation as "verb class one" and is encoded as "V1" (with the GCS-internal representation of '01'B). There are, however, some special classes of endings in verb class one, which may be handled by general rules, as follows. If a verb in class V1 ends in an "e", then the preceding letter must be inspected before the suffix complex may be assigned. If this letter is not an "e", "i", or "o", then the suffix complex [e, es, ed, ing] is used in place of the normal V1 complex (which is [0 s, ed, ing]), in effect dropping the "e" before adding "ing." If the penultimate letter is "e " or "o", however (e.g., "agree", "toe") , then the suffix complex [0, s, d, ing] is used, and if it is "i", then the special V1 suffix complex [ie, ies, ied, ying] is used.

Verb class two (encoded as "V2", with the GCS-internal presentation of '10'B) is characterized by the suffix complex [0, es, ed, ing], and includes: (1) words such as "possess" and "lunch" (which end in a sibilant and thus require that their present-tense, third-person singular form end in "es"); and (2) words such as "go" an "do" (which are required by arbitrary rules of English orthography to end in "es" when put into their present-tense, third-person singular forms). There are no special rules in verb class two based on the last consonant, although there is a small group of verbs ending in a single "s" or "z" (encoded, as noted below, b class V2d) that exhibits doubling phenomena in all non-base forms.

Verb class three (encoded as V3, with the GCS-internal representation of '11'B) is characterized by the suffix complex [y, ies, ied, ying], and consists of verbs whose present-tense, third-person singular agreement forms exhibit an "y/ies" alternation with their base forms (generally those verbs with a penultimate consonant, e.g., "try/tries", as opposed to "stay/stays", and "buy/buys"). Verb class three has no special rules based on the consonant preceding the "y", through some special processing is necessary in GcsUnfl and GcsInfl to ensure the separation from lass V3 the special V1 paradigm noted above that is characterized by the suffix complex [ie, ies, ied, ying] (e.g., "belie" and the regular paradigm associated with the word "lie").

Verb class four (encoded as V4, with the GCS-internal representation of '00'B) is characterized by the suffix complex [0, s, 0, ing], and consists of verbs whose past forms are indistinguishable from their base forms, e.g., "cost".

In all verb classes except for V3, the basic paradigms described above may be modified by the doubling of the last consonant of the base form before the addition of the ending; base forms of this type receive the special character "d" following their verb inflectional class code, and are interpreted as follows:

Verb class one: V1d encodes the paradigm [0 s, Ded, Ding] (where D indicates the doubling of the consonant preceding the suffix), e.g., "abet, abets, abetted, abetting" (there are at present 301 verbs in this sub-class, out of the 4,424 verbs in class V1).

Verb class two: V2d encodes the paradigm [0, Ds, Ded, Ding], e.g., "quiz, quizzes, quizzed, quizzing" (there are at present 4 verbs in this sub-class, out of the 287 verbs in class V2).

Verb class four: V4d encodes the paradigm [0 s, 0 Ding], e.g., "cut, cuts, cut, cutting" (there are at present 23 verbs in this sub-class, out of the 33 verbs in class V4).

These special paradigms are encoded by setting a special bit ($B_{14}$) in the verb base form inflectional code string ($B_{14-16}$).

Partial paradigms are defined as well for verb classes one through three when the second bit in MD-REC.X-FLGS (which corresponds to the verb's base form) is set to '1'B; in this case the past form is left out of the paradigm and in its place is substituted the form of pair of forms (past tense, past participle) located by reference to the irregular forms' exception dictionary.

One further verb class (encoded as V1x) is reserved for the small number of verbs ending in "-c" that have a paradigm characterized by the suffix complex [c, cs cked, cking] (e.g., "panic", "traffic", etc.); these verbs have both their past form and their present participle stored in the irregular forms, exception dictionary.

2.2.4. Encoding of Irregular Paradigms

As noted above, many paradigms in English are characterized by the occurrence of one or more elements that are not related to the base form of the paradigm in the same way as the majority of similar "regular" forms are. For example, the plural form of the noun "man" is "men" (rather than the "regular" form "mans" which does, however, occur as the third-person present-tense singular form of the verb "to man"); similarly, the past tense form and past participle of the verb "write" are "wrote" and "written", respectively (rather than the "regular" form "writed").

As it turns out, most irregular noun paradigms in English have two roots, one for the singular form and one for the plural, and the corresponding possessive forms are formed by adding "'s" to each root. Thus an irregular paradigm of this type may be encoded as two parallel lists, the $n^{th}$ element of the first one corresponding to the singular form root and the $n^{th}$ element of the second one corresponding to the plural form root. Using this system, the only difference between the procedures of inflecting regular and irregular nouns is the insertion of an additional step in the latter procedure to perform a root substitution (by switching the root reference from the current list to the other one) whenever a form of this type switches from singular to plural or vice versa.

Similarly, most irregular verb paradigms have no more than three roots, one for the base form (which is inflected in a regular manner to obtain the third-person present-tense singular form and the present participle), one for the past tense form, and one for the past participle (if it is to the past tense form). Thus an irregular paradigm of this type may be encoded as three parallel lists, the $n^{th}$ element of the first one corresponding to the base form root, the $n^{th}$ element of the second one corresponding to the past tense form root, and the $n^{th}$ element of the third one corresponding to the past participle root. Using this system, the only difference between the procedures of inflecting regular and irregular verbs is the insertion of an additional step in the latter procedure to perform a root substitution (by switching the root reference between the three lists) whenever a form of the type switch between the three root types.

There are, however, more complex paradigms for the verbal auxiliaries; for example, the verb "have" has the irregular third-person present-tense form "has" (as well as the irregular past tense form/past participle "had"), and the verb "be" has an eight-member paradigm that requires distinctions not present in any other verbal paradigm (e.g., number agreement in the past tense to differentiate between the forms "was" and "were"). These irregularities are handled separately, by a special verbal auxiliary processor.

As noted above, however, the large majority of irregular and verbs in English fit into patterns where a small number of roots for each base form may be stored in certain well-defined (plural form for nouns; past tense form and past participle for verbs) and then used to generate the full paradigm for each irregular form. The list-oriented method given as an example above describes one possible method of storage for the generation of irregular paradigms—however, it has two major drawbacks.

The first drawback concerns methods of access; if the list are ordered alphabetically according to base form (or, in general, are in any order that makes it easy to access the elements of one particular list), then it will be difficult to access a base form when given one of its inflected forms (or, in the general case, to access elements of the well-ordered list from any of the other ones), since the inflected-form lists will not be in a easily-searched order. Because the GCS programs require both that (a) inflected forms be easily generated from their base forms and (b) base forms be easily from any of their inflected forms (no matter how irregular), then the ordering of the "lists" of forms in the exception dictionary must be such that one method of access be no more difficult than the other.

The second drawback is that the mappings between the lists described above are neither unique nor one-to-one; words exist in English which are: (a) irregular inflected forms that are also the base forms of regular paradigms (e.g, "found" is the irregular past tense form/past participle of the verb "find", but is also a regular noun and verb base form in its own right); (b) irregular inflected forms that are also the base forms of irregular paradigms (e.g., "saw" is the irregular past tense form of the verb "see", but is also the base form of the irregular paradigm including the past participle "sawn", as well as being as regular noun base form); (c) irregular base forms that are also past tense forms in their own paradigms (e.g., "beat", with the past tense form "beat" and the past participle "beaten"), (d) irregular base forms that are also past participles in their own paradigms (e.g., "come", with the past participle "come" and the past tense form "came"); and (e) base forms that have both regular and irregular paradigms (e.g., "lie" has the irregular past tense form "lay" and past participle "lain" for its meaning "to lie (down)" and the regular past tense form/past participle "lied" for its meaning "to tell a falsehood") . The existence of words of the above types means that, in order to determine all usages of a given word, all three lists may have to be searched.

Both of the above problems may be eliminated by constructing a more sophisticated storage representation than the parallel lists described above. The first step is to store all grammatical information for both regular and irregular forms in the lexicon, with the irregular forms differentiated by a special flag. This flag would be keyed to the specific irregular element within a given word's tag string, e.g., if the flag is encoded as "±{irr.}", then the word "beat" would have a tag string representable as: "N1(−{irr}) V1(+{irr}) VBD(+{irr.}) JJ(−{irr.}) " (indicating that the noun and adjective forms are not irregular and that the verb base and past tense forms are irregular). Similarly, the word "foot" would have a tag string representable as: "N1(+{irr.}V1(−{irr.}) " (indicating that the noun base forms is irregular and the verb base form is not), and the word "lie" would have a tag string representable as: "N1(+{irr.}V1(+{irr.}V1(−{(irr.)}" (indicating that the noun base form is regular and that there are two verb base interpretations, one that is regular and one that is not). The actual internal representation used in the GCS main dictionary is somewhat different in form from the particular notation presented above, but it is (in general) conceptually equivalent; the important idea is that the "+{irr}" feature serves to indicate that further processing is necessary to recover the other elements of a given word's paradigm, and that this processing is a straightforward search for linked nodes, since all other grammatical information is stored on the given word's main dictionary record.

```
/*---------------------------------------------------------------*
 *                                                                *
 * COPYRIGHT (c) Houghton Mifflin Company Grammar Correction System. *
 * This work is protected by the United States Copyright Laws as an *
 * unpublished work and by Houghton Mifflin as trade secret information. *
 * Solely for use in licensee software as permitted by written license *
 * from Houghton Mifflin. Disclosure of contents and of embodied *
 * programs or algorithms prohibited.                             *
 *                                                                *
 *----------------------------------------------------------------*

*----------------------------------------------------------------*
 *                                                                *
 *  Gcolotab.c - reduced probability collocation table            *
 *                 -sequential listing-                           *
 *----------------------------------------------------------------*/ include      "Gtblhdr.c"
include      "/hmdev/hmclib/gcs/disl/Gdisl.h"

UINT2B FAR Gcolotab[92][92] = {
0,         827,       1,         141,
1394,      1364,      488,       1817,
557,       467,       694,       964,
1145,      785,       813,       1894,
9,         23,        558,       805,
258,       58,        1104,      1740,
1,         361,       648,       2065,
1,         68,        1,         5525,
1584,      4093,      1,         201,
```

```
1071,       60,         1,          1,
902,        4939,       1,          1,
1,          4158,       1,          1,
254,        3427,       427,        1,
259,        556,        1651,       538,
481,        1,          192,        317,
151,        1616,       286,        1,
149,        839,        1,          1,
217,        1,          40,         1,
137,        1751,       573,        89,
484,        97,         62,         694,
284,        231,        1,          1,
79,         9018,       159,        328,
247,        26,         1,          838,
99,         390,        36,         388,
160,        1,          903,        4693,
1558,       131,        7455,       871,
959,        964,        999,        312,
233,        44,         1,          1,
1,          980,        1,          216,
484,        36,         1,          3814,
750,        38,         1,          1,
1,          283,        830,        1,
1,          3223,       1,          378,
268,        2317,       478,        604,
1693,       1           269,        1,
311,        160,        109,        167,
567,        660,        1,          1,
569,        1,          921,        1,
1,          1,          1,          1,
1,          1,          1,
```

What is claimed is:

1. A processor for parsing digitally encoded natural language text, such processor comprising means for receiving encoded natural language text for processing, dictionary means for storing words of the natural language together with a list of associated tags indicative of the possible grammatical or syntactic properties of each word, means for looking up a word of the text in the dictionary and annotating the word with its associated tags from the dictionary to provide a word record, means operative on word records of words of a sentence for defining a relative probability of occurrence of a tag sequence consisting of one tag selected from the word record of each word of a sequence of words of the sentence, means for constructing a selected set of tag sequences having a tag selected from the tags associated with each word of the sequence of words and determining a tag sequence of greatest relative probability of occurrence thereby identifying a single most probable tag for each word of the sequence, and grammatical processing means for identifying grammatical structure from the ordering of the single tag for each said word so as to obtain a parse of the sentence.

2. A processor according to claim 1, wherein the means for defining a relative probability of tag sequences includes means for selecting fewer than a fixed number n of sequences from said selected set and for defining said relative probability thereon.

3. A processor according to claim 1, wherein the means for determining a tag sequence of greatest relative probability of occurrence further includes means for determining, in order, tag sequences having successively lesser relative probabilities of occurrence, thereby identifying a succession of next most probable tags for each word of the sequence, and wherein the means for further processing includes means for processing a said next most probable tag of a word in the event the most probable tag does not produce a parse of the sentence.

4. A processor according to claim 1, wherein the means for defining a relative probability of occurrence of a tag sequence corresponding to a sequence of words includes means for modifying said relative probability in accordance with an observed reduced frequency of occurrence of a tag of said tag sequence corresponding to a particular word of the sequence of words.

5. A processor according to claim 1, wherein the means for defining a relative probability of occurrence includes means for recognizing a word of the sequence of words which is commonly confused with a different word, and means for substituting a tag of such different word in the tag sequence, such that the means for selecting a tag sequence of greatest relative probability determines if the tag of said different word has a greater relative probability of occurrence.

6. A processor according to claim 5, wherein the means for selecting a tag sequence of greatest relative probability of occurrence further includes means for identifying in order tag sequences having successively lesser relative probabilities of occurrence, thereby identifying a succession of next most probable tags for each word of the sequence, and wherein the means for further processing includes means for processing a said next most probable tag of a word in the event the most probable tag does not fit a correct parse of the sentence.

7. A processor for processing digitally encoded natural language text, such processor comprising
    means for receiving digitally encoded natural language text,
    dictionary means for storing base forms of words of the natural language together with data codes indicative of grammatical or syntactic properties of each stored word,
    means for looking up each word of the text in the dictionary and for annotating the word with its said data codes to create a word record,
    collocational analysis means for performing a defined calculation to construct a function on a bounded set of selected sequences of data codes so as to determine for each word a data code indicative of its probable grammatical usage,
    said collocational analysis means including
    first means operative on word records for assigning a likelihood of co-occurrence of data codes of adjacent words,
    second means for iteratively applying said first means to develop a probability-like measure on each of an ordered set of sequences of data codes wherein each successive data code of a sequence is selected from the word record of a successive word of the text, and
    means for determining a plurality of sequences of data codes of greatest probability thereby, associating with each word of the text a plurality of most probable data codes.

8. A processor according to claim 7, wherein the collocational analysis means further comprises
    means for identifying commonly confused word pairs, and also includes means for constructing, when a given word of text is one word of a pair of commonly confused words, said function on sequences of data codes from each said word so as to determine whether a data code of the other word of the pair is more probable than the data codes of the given word.

9. A processor according to claim 8, wherein the collocational analysis means further comprises
    means for identifying words which occur in particular grammatical uses with reduced frequency, and
    means for providing in the defined calculation a weight reduction factor corresponding to a said reduced frequency for modifying the determination of a said most probable data code for an identified word of the sentence.

10. A processor according to claim 9, further comprising
    error display means for displaying an error message when the processor determines said data code of said other word is more probable than the data codes of the given word.

11. A grammatical processor for processing digitally encoded natural language text so as to parse sentences of the text, such processor comprising
    a dictionary of words of the language including for each word indications of its possible grammatical tags,
    tag annotation means for looking up words of a text sentence in the dictionary and annotating each word with its possible tags,
    tag selection means, including means for applying a collocation probability matrix to syntactically adjacent pairs of tags, and
    means for iteratively building up a probability-like measure on sequences formed of the possible tags of a sequence of words to determine at least one sequence of greatest probability thereby determining, when a word is annotated with more than one tag, a most probable tag of the word as a function of possible tags of surrounding words of the text sentence, and
    means for processing a string consisting of the most probable tags of the words of the sentence to identify the grammatical function of each word and determine a parse of the sentence.

12. A computerized system for the grammatical annotation of natural language, such system comprising
    means for receiving encoded natural language text for processing,
    means for annotating a word of the text with a tag set of tag indicative of possible grammatical or syntactic uses of the word,
    selection means operative on the tag sets of the words of a sequence of words for determining the most probable tag of each word of the sequence, such selection means including
        (i) means operative on pairs of tags, one from the tag set of each of two adjacent words, for defining an empirical collocational likelihood, and
        (ii) means for extending said empirical likelihood to a function defined on a bounded subset of possible tag sequences constructed from the tag sets of words of a sequence of words of a sentence, the value of said function on a sequence of tags corresponding to the likelihood of occurrence of a sequence of words having said sequence of tags, whereby determination of the tag sequence of greatest value determines the most likely tag of each word of the sequence.

13. An improved annotator for annotating natural language words with tags indicative of possible grammatical or syntactic uses of the words, such annotator comprising means for receiving an encoded natural language sentence for processing, means for assigning to a word of the sentence a set of tags indicative of the possible grammatical or syntactic uses of said word, and tag disambiguation means for identifying a single tag of a multiply-tagged word, such tag disambiguation means including means for constructing a selected bounded subset of tag sequences representative of possible tags associated with a sequence of respective words of the sentence, the sequence of words including said multiply-tagged word, means for defining a function value on each tag sequence of said subset of tag sequences, and means for selecting a specific tag sequence having the greatest function value defined thereon, whereby a single tag is identified from the multiply-tagged word by a single tag of said specific tag sequence thereby associated with said word.

14. An annotator according to claim 13, further comprising a spelling verifier having means for detecting misspelled words and for identifying candidate replacement words, wherein the means for identifying candidate replacement words includes selection means for selecting candidate replacement words having a tag with a syntactic context compatible with that of the mispelled word.

15. An annotator according to claim 13, further comprising transformation means for transforming a natural language between sound and text representations, wherein the transformation means includes means for resolving ambivalent representations of words by selection of the word whose tag is consistent with the syntactic context of the ambivalent word.

16. An annotator according to claim 15, wherein the transformation means is a text-to-sound transformation system and the ambivalent representations are homographs.

17. An annotator according to claim 15, wherein the transformation means is a sound-to-text transformation system and the ambivalent representations are homonyms.

* * * * *

UNITED STATES PATENT AND TRADEMARK OFFICE
CERTIFICATE OF CORRECTION

PATENT NO. : 4,868,750

DATED : 19 September 1989

INVENTOR(S) : Henry Kucera; Alwin B. Carus; and Jeffrey G. Hopkins

It is certified that error appears in the above-identified patent and that said Letters Patent is hereby corrected as shown below:

Column 3, line 61, after "FIG. 6", insert --A--.

Column 3, line 63, after "FIGS." delete "7", and insert --6B--.

Column 38, line 58, after "tag", insert --s--.

Signed and Sealed this

Thirtieth Day of June, 1992

Attest:

DOUGLAS B. COMER

*Attesting Officer*       *Acting Commissioner of Patents and Trademarks*